(12) United States Patent
Ogino et al.

(10) Patent No.: US 7,793,877 B2
(45) Date of Patent: Sep. 14, 2010

(54) BATTERY DEVICE FOR FISHING AND POWER SUPPLY METHOD FOR ELECTRIC FISHING REEL

(75) Inventors: Yoshihide Ogino, Tokorosawa (JP);
Tomoyuki Amano, Tokorosawa (JP);
Kyoichi Kaneko, Higashi Kurume (JP)

(73) Assignee: Daiwa Seiko, Inc., Tokyo (JP)

( * ) Notice: Subject to any disclaimer, the term of this patent is extended or adjusted under 35 U.S.C. 154(b) by 1016 days.

(21) Appl. No.: 11/315,018

(22) Filed: Dec. 23, 2005

(65) Prior Publication Data
US 2006/0180689 A1    Aug. 17, 2006

(30) Foreign Application Priority Data
Dec. 24, 2004   (JP)   ............................. 2004-375049
Jul. 13, 2005    (JP)   ............................. 2005-204707

(51) Int. Cl.
*A01K 89/01*    (2006.01)
(52) U.S. Cl. .................. 242/250; 242/225; 242/253
(58) Field of Classification Search ............. 242/225, 242/226, 250, 251, 253
See application file for complete search history.

(56) References Cited
U.S. PATENT DOCUMENTS

| | | | | |
|---|---|---|---|---|
| 1,062,488 A * | 5/1913 | McCluer et al. | ................ | 43/21 |
| 3,126,166 A * | 3/1964 | Weinberg | .................... | 242/250 |
| 3,784,125 A * | 1/1974 | Law et al. | ................... | 242/387 |
| 4,784,346 A * | 11/1988 | Steffan | ....................... | 242/250 |
| 4,962,901 A * | 10/1990 | Shirley et al. | ............... | 242/323 |
| 5,088,657 A * | 2/1992 | Chen | ........................... | 242/225 |
| 6,012,665 A * | 1/2000 | Olona | ......................... | 242/250 |
| 6,896,216 B2 * | 5/2005 | Chiba | ......................... | 242/250 |
| 7,086,622 B1 * | 8/2006 | Whaley | ....................... | 242/323 |
| 7,269,922 B1 * | 9/2007 | Mack | ............................. | 43/21 |
| 7,309,039 B1 * | 12/2007 | Stone | ......................... | 242/225 |

FOREIGN PATENT DOCUMENTS

| | | |
|---|---|---|
| JP | 1-94058 U | 6/1989 |
| JP | 3-76465 A | 4/1991 |
| JP | 3-76465 U | 7/1991 |
| JP | 10-113106 A | 5/1998 |
| JP | 10-215737 A | 8/1998 |

(Continued)

OTHER PUBLICATIONS

Japanese Office Action with drafting date of Jun. 27, 2008, with translation (9 pages).
Japanese Office Action dated Oct. 13, 2006.

*Primary Examiner*—Emmanuel M Marcelo
(74) *Attorney, Agent, or Firm*—Sughrue Mion, PLLC

(57) ABSTRACT

A cell main body and a control portion are tightly stored within a case main body, which is provided with a joint connector for electrical connection to the cell main body and the control portion. A nut member is disposed to surround this joint connector, which is attached for feeding to a feed connection portion for external power source connection of an electric reel. The nut member is screwed around a ferrule portion of the feed connection portion, and the case main body is mounted on the electric reel in a state where an engaged portion of the nut member is engaged by an engagement portion of the joint connector.

24 Claims, 19 Drawing Sheets

FOREIGN PATENT DOCUMENTS

| | | | |
|---|---|---|---|
| JP | 2000-14290 A | | 1/2000 |
| JP | 2000-27676 A | | 1/2000 |
| JP | 2001258442 A | * | 9/2001 |
| JP | 2007135517 A | * | 6/2007 |
| JP | 2007195433 A | * | 8/2007 |
| JP | 2007252273 A | * | 10/2007 |

* cited by examiner

BATTERY DEVICE FOR FISHING AND POWER SUPPLY METHOD FOR ELECTRIC FISHING REEL

BACKGROUND OF THE INVENTION

The present invention relates to a battery device for fishing used to supply electric power to a fishing reel having a drive motor for rotating and driving a spool having the fishline wound, and a power supply method for electric fishing reel, for example.

Recently, a so-called electric reel for driving a spool having the fishline wound by a drive motor is mostly employed in the fishing on the ship in the deep field or offshore. As means for supplying electric power to the spool drive motor for such electric reel, a method has been well known in which a battery device is installed at a location away from the fishing spot to supply electric power, using a long feeding cord, to a feeding connection portion provided in a reel main body containing the spool drive motor (e.g., refer to patent documents 1 and 2).

However, when the fishing reel is connected to the battery device far away from the fishing reel via such long feeding cord, the long feeding cord itself is an obstacle, and further, constrains the motion of a fishing rod, in waiting for a strike of fish, or performing a decoy operation or an operation of taking in the fish, making it difficult to perform the decoy operation or the operation of taking in the fish as desired, whereby there is a disadvantage of the worse operability.

Thus, as means for supplying electric power to the spool drive motor for the electric reel, a method for employing a dedicated cell box having one-to-one relation with the electric reel but not employing the feeding cord has been offered (e.g., refer to patent document 3). This feeding means is freely rotatably provided with a metallic bolt serving as a connection terminal in the cell box. And the electric reel is provided with a tapped hole serving as a connection terminal electrically connected to the spool drive motor on the rod end, and the bolt of the cell box is screwed into the tapped hole. Thereby, the electrical connection and mounting and fixing between the feeding means and the electric reel are achieved.
Patent document 1: JP-A-2000-27676
Patent document 2: JP-A-10-215737
Patent document 3: JP-A-3-76465U However, in the means for supplying electric power to the electric reel, the cell box is electrically connected and securely mounted by screwing the metallic bolt serving as the connection terminal into the tapped hole of the electric reel, whereby there is a problem that if violently treated, the cell box is damaged to make the stable power feed difficult.

SUMMARY OF THE INVENTION

This invention has been achieved in the light of the above-mentioned problem, and it is an object of the invention to provide a battery device for fishing that can be mounted reliably and securely by realizing a simple and easy mounting or dismounting operation, and a power supply method for electric fishing reel thereof.
(1) A battery device for fishing comprising:
a case main body that stores a cell, the case main body provided with a joint connector electrically connected to the cell and attached for feeding to a feed connection portion for external power source connection of a fishing reel; and
a holding member for mounting the case main body on the fishing reel.
(2) The battery device for fishing according to (1), wherein the holding member is provided at the case main body.
(3) The battery device for fishing according to (1), wherein the holding member is disposed to surround the joint connector.
(4) The battery device for fishing according to (1), wherein the holding member slides with respect to the case main body by a mounting operation on the fishing reel.
(5) The battery device for fishing according to (1), wherein the holding member comprises a nut member that is rotatably provided around the joint connector and is screwed with the fishing reel.
(6) The battery device for fishing according to (1), wherein the case main body is formed with an inclined portion from a storage portion in which the cell is stored to a cylindrical portion where the joint connector is provided.
(7) The battery device for fishing according to (1), wherein the case main body surrounds the holding member.
(8) The battery device for fishing according to (1), wherein the holding member is provided not to protrude in a circumferential direction of the case main body.
(9) The battery device for fishing according to (1), wherein the holding member is rotatably fitted into the case main body.
(10) The battery device for fishing according to (1), wherein the holding member mounts the case main body on the fishing reel in a state that the joint connector is attached for feeding to the feed connection portion.
(11) The battery device for fishing according to (10), wherein the holding member covers a portion between the joint connector and the feed connection portion.
(12) The battery device for fishing according to (10), wherein a base end portion of the joint connector is fixed inside the case body.
(13) The battery device for fishing according to (10), wherein a base end portion of the joint connector is supported by a cylindrical portion of the case body.
(14) The battery device for fishing according to (10), wherein the joint connector is made of flexible material softer than the case body.
(15) The battery device for fishing according to (10), wherein the case body is provided with a protection cap detachably attached to an end portion of the joint connector.
(16) The battery device for fishing according to (1), wherein the joint connecter is provided on the case main body so as to be projected therefrom.
(17) A method of supplying power to a motor which for driving and rotating a spool supported by a fishing reel body, the method comprising:
connecting a joint connector of a battery device for fishing to a feed connection portion of the reel body, thereby the portable battery being supported by the reel body; and
supplying power from the portable battery to the motor.
(18) A fishing system comprising:
a fishing reel including:
a reel body;
a spool for winding a fishing reel rotatably supported by the reel body;
a motor for driving and rotating the spool; and
a feed connection portion through which power is supplied to the motor; and
a battery device for fishing including a joint connector attached for feeding to the feed connection portion.
(19) The fishing system according to (18), wherein the feed connection portion can be selectively connected directly to a cable connector of a feeding cord extending from an external power source and the joint connector to supply power from the external power source or the battery device.

(20) The fishing system according to (18), wherein the feed connection portion is provided at a portion lower than a spool shaft which supports the spool and provided at a side opposite to a side in which a handle is provided, and the battery device is arranged at a lower side of the feed connection portion.

(21) The fishing system according to (18), wherein the battery device comprises:
a cell;
a case main body that stores the cell;
the joint connector projected from an upper portion of the case main body and being softer than the case main body;
a holding member for preventing the feed connection portion and the joint portion from disconnecting from each other.

(22) The fishing system according to (18), wherein the battery device contains lithium ion cell.

(23) The fishing system according to (18), wherein the battery is attached to a side of the fishing reel which is opposed to a side at which the center of gravity of the fishing reel exists with respect to the reel leg.

With this constitution, the case main body is mounted via the holding means on the fishing reel in a state where its joint connector is connected via the holding means to the feed connection portion of the fishing reel and attached to be able to feed electric power. Thus, the joint connector is protected securely, whereby the joint connector is electrically connected to the feed portion of the fishing reel, and the case main body is stoutly assembled with the fishing reel. Accordingly, a simple and easy mounting or dismounting operation is realized even in the severe fishing environments, and it is possible to withstand relatively violent rod operations.

As described above, with this invention, it is possible to provide a battery device for fishing in which the fishing battery is mounted and securely fixed on the fishing reel.

9: attachment, 10: case main body, 11: storage portion, 12: lid portion, 121, 121a: mounting hole portions, 122: elastic engaged portion, 123, 123a, 123c: cylindrical portions, 123d: abutment portion, 123e: guide groove, 124: opening, 125: convex portion, 126: projection portion, 127: elastic deformation portion, 13: cell main body, 14: control portion, 15: joint connector, 151: concave connection terminal, 151a: convex connection terminal, 152: engagement portion, 153: concave portion, 16: mounting member, 17: packing member, 18: elastic arm portion, 181: protection cap, 19: nut member, 191, 191b: operation portions, 192, 192a, 192b, 192c: engaged portions, 193, 193b: concave portions, 193c: convex portion, 20: electric reel, 21: feed connection portion, 22: ferrule portion, 221: concave engaged portion, 23: threaded portion, 24: convex connection terminal, 24a: concave connection terminal, 25: elastic arm portion, 251: protection cap, 30: rod, 301: handle grip portion

DETAILED DESCRIPTION OF PREFERRED EMBODIMENTS

The preferred embodiments of the present invention will be described below in detail with reference to the drawings.

First Embodiment

Figure 1:
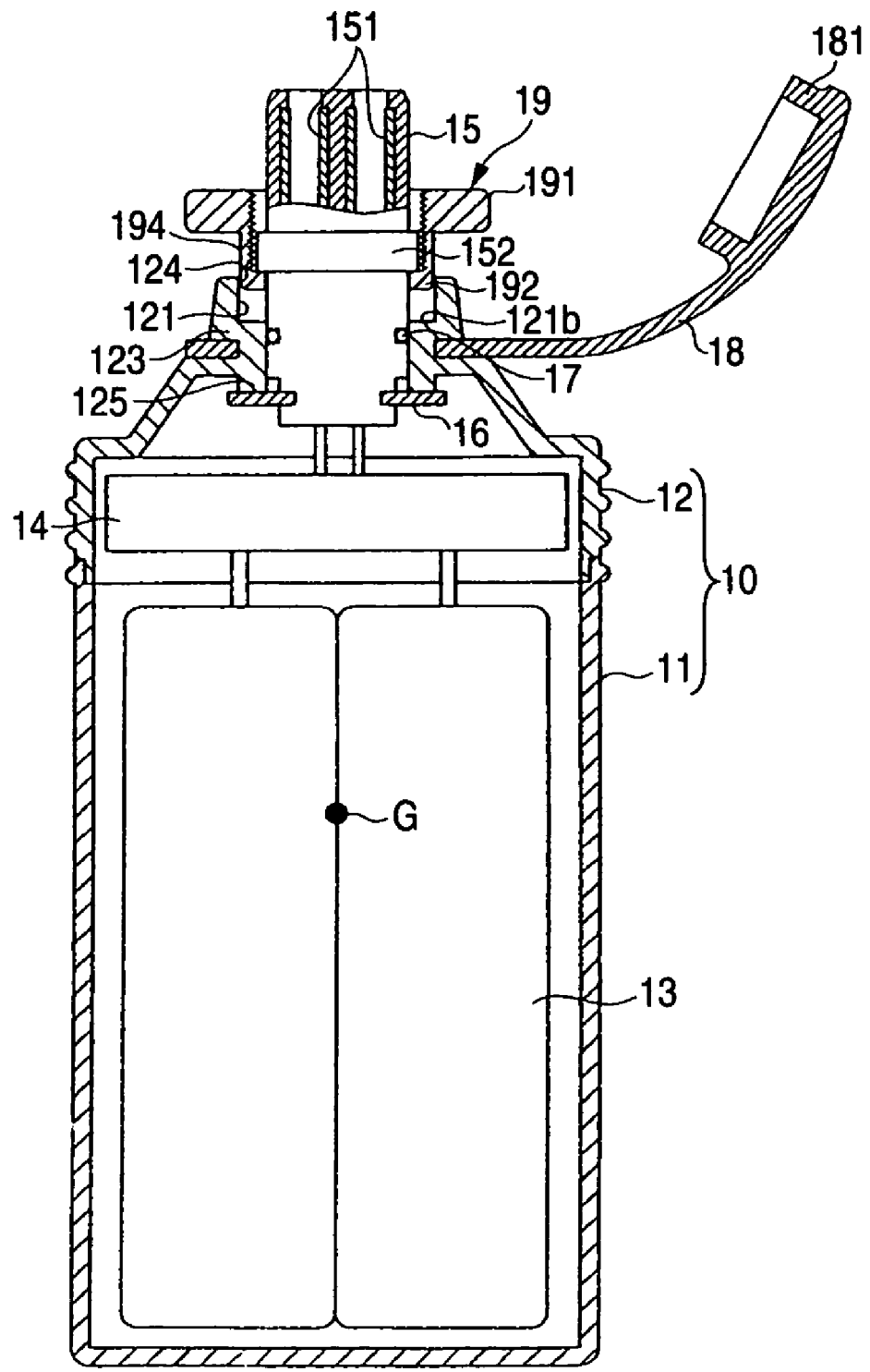
FIG. 1 is a cross-sectional view showing a battery device for fishing according to a first embodiment of the present invention.
Figure 2:
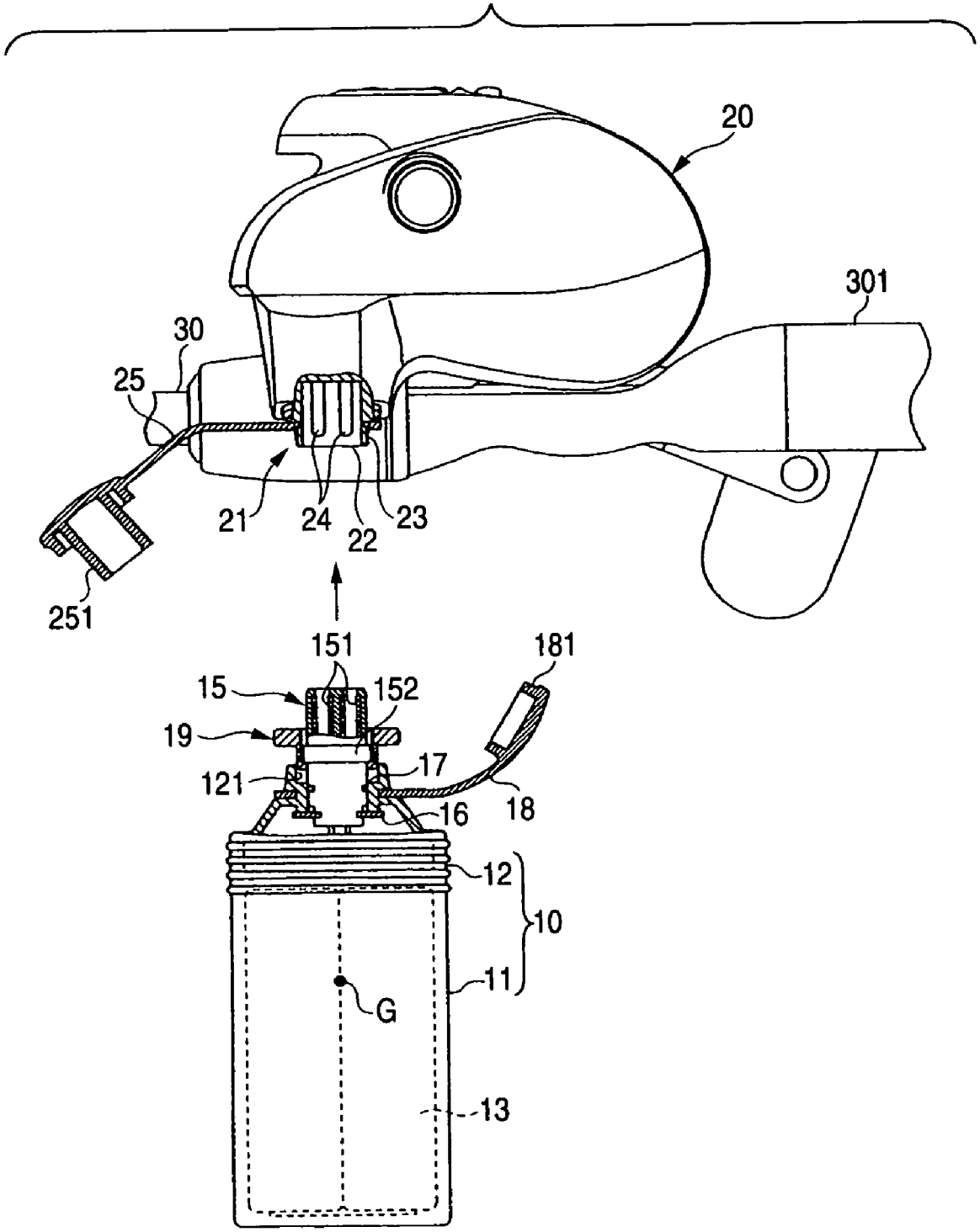
FIG. 2 is a partial cross-sectional view showing a state before the case main body of FIG. 1 is attached to the electric reel.

FIG. 1 shows a battery device for fishing according to a first embodiment of the invention. A case main body 10 is formed of synthetic resin, and comprises a storage portion 11 for storing a cell main body 13 and a lid portion 12 for closing an opening formed above the storage portion 11, which are separately formed. Inside the case main body, the cell main body 13 such as lithium ion cell and a control portion 14 for charging and discharging control are sealingly stored and bonded by adhesives. The case main body 10 for sealingly storing the cell main body 13 and the control portion 14 is attached on or suspended from a feed connection portion 21 for external power source connection disposed forward on the lower portion of a well-known electric reel 20, as shown in FIG. 2, instead of employing a well-known feeding cord extending from the external power source such as a power source for ship, a generator or a large battery, to feed power to the electric reel 20 and drive a spool drive motor for rotating a spool S supported by a spool shaft Sa. Incidentally, the spool S can also be rotated by operating a handle 2 (see FIG. 5).

Incidentally, the feed connection portion 21 may be designed so as to be selectively connected directly to a cable connector of the feeding cord extending from the external power source and the joint connector. With this arrangement, a user can select two types of power source depending on circumstance. The feed connection portion 21 is provided at a portion lower than the spool shaft Sa which supports the spool S and provided at a side opposite to a side in which the handle 2 is provided, and the battery device is arranged at a lower side of the feed connection portion 21.

An angler usually holds a side plate which is positioned opposed to a side plate on which the handle is provided. If the center of gravity of the fishing reel lies at a side where the handle is provided with respect to a reel leg (rod attaching portion of the fishing reel), the angler feels the fishing reel heavy. According to the present invention, the battery is attached to the side (which the angler usually holds) of the fishing reel which is opposed to the side at which the center of gravity of the fishing reel lies with respect to the reel leg. With this arrangement, the center of gravity of the fishing reel lies at the side which the angler holds, that is, approaches the side plate of the fishing reel which the angler holds, and thus the angler relatively does not feel the fishing reel heavy.

The lid portion 12 is provided with a mounting hole portion 121 in the almost central part of an upper face (mounting face) passing through the center of gravity G of the case main body 10. The mounting hole portion 121 has an opening 124 at an upper end of a cylindrical portion 123 extending in a direction farther away (upward) from the center of gravity G on the upper face. A base end portion of the joint connector 15 electrically connected to the control portion 14 and the cell main body 13 is fixed by adhesives inside the mounting hole portion 121, and supported via a mounting member 16 making up a support portion, so that the joint connector 15 extends upward farther away from the center of gravity G, and is sealed by the adhesives or a packing member 17 disposed between the mounting hole portion 121 and it in a state where its top end portion projects from the opening 124 of the mounting hole portion 121 in the cylindrical portion 123.

In this way, the base end portion of the joint connector 15 is fixed within the case main body 10, its top end portion projects out of the opening 124 of the case main body 10. The mounting member 16 is engaged in the base end portion of the joint connector 15. This mounting member 16 extends in the circumferential direction of the joint connector 15, and comes into contact with a lower end portion of a convex portion 125 of the cylindrical portion 123 protruding within the case main body 10, so that the joint connector 15 is engaged and prevented from getting rid of the opening 124 of the mounting hole portion 121. The mounting member 16 blocks a gap between the joint connector 15 and the mounting hole portion 121 to prevent entry of water into the case main body 10, and entry of adhesives in mounting the joint connector 15 on the case main body 10.

The outer shape of the joint connector 15 conforms to the inside of the mounting hole portion 121, such that the mounting hole portion 121 of the cylindrical portion 123 is cylindrical, and the joint connector 14 is columnar, to allow the insertion of the joint connector 15. Therefore, the outside of the joint connector 15 is borne and stably supported within the mounting hole portion 121 of the cylindrical portion 123, whereby the outside of the joint connector 15 is firmly fixed inside the mounting hole portion 121 of the cylindrical portion 123 by adhesives.

The mounting hole portion 123 extends into the cylindrical convex portion 125 to lead into the case main body 10. The joint connector 15 is fixed in the mounting hole portion 123 of the convex portion 125 by adhesives, its base end being exposed to project into the case main body 10. The joint connector 15 is strongly supported and stabilized, because its base end portion is supported from the inside to the outside of the case main body 10 by the mounting hole portion 121 of the cylindrical portion 123.

Since the case main body 10 is formed of synthetic resin that is a less flexible and harder material than the joint connector 15, the cylindrical portion 123 is harder and less flexible than the joint connector 15. Accordingly, even if the joint connector 15 having greater flexibility than the case main body 10 is flexed, it is securely held by the case main body 10, whereby the vibration of the battery device for fishing mounted on the electric reel 20 is prevented, and stabilized.

Thereby, the joint connector 15 is positioned and fixed within the case main body 10 in a liquid tight state, and can be assembled tightly. The cylindrical portion 123 has the cylindrical convex portion 125 formed extending within the case main body 10. Since the base end portion of the joint connector 15 is also supported in this convex portion 125, a portion supporting the joint connector 15 becomes greater, and is stably supported in the case main body 10. Owing to provision of the convex portion 125, the upward projection of the cylindrical portion 123 supporting the joint connector 15 is reduced.

This joint connector 15 is provided with a pair of concave connection terminals 151 having flexibility, and formed of a non-conductive resin material that is softer than the case main body 10, constituting a so-called socket-type convenience outlet. The concave connection terminals 151 are electrically connected to the control portion 14 at the base end. Herein, in a state where the joint connector 15 is fixed and mounted on an inner side face of the case main body 10 in liquid tight state, a top end portion of the joint connector 15 projects directly from the opening 124 of the case main body 10 to the outside of the case main body 10, so that the concave connection terminals 151 are electrically connected to the control portion 14, protecting the wiring system to enable the repetitive mounting or dismounting operation of the electric reel 20 to or from the feed connection portion 21 stably.

One end of an elastic arm portion 18 formed of a resin material having insulation property around its periphery is attached elastically deformably to the cylindrical portion 123 of the lid portion 12. At the distal end portion of the elastic arm portion 18, a non-conductive protection cap 181 is provided corresponding to the distal end portion of the joint connector 15. Thereby, the protection cap 181 is put on the distal end portion of the joint connector 15, making use of the elastic deformation of the elastic arm portion 18 in a state where the joint connector 15 of the case main body 10 is separated from the feed connection portion 21 of the electric reel 20. Thereby, the case main body 10 is protected from electrical connection of the concave connection terminal 151 of the exposed joint connector 15 with the surroundings, when in portable use.

Moreover, the case main body 10 has holding means for holding the fishing battery not to drop out, when attached on the electric reel 20. In this embodiment, a nut member 19 of the holding means is provided operably in the cylindrical portion 123. That is, in the mounting hole portion 121 of the lid portion 12, the nut member 19 making up the holding means in connecting the joint connector 15 and the feed connection portion 21 of the electric reel 20 is rotatably fitted to surround the periphery of the joint connector 15 in a state where at least a part (side wall 194) of the nut member 19 is inserted into the mounting hole portion 121 of the cylindrical portion 123. This nut member 19 is provided with a collar-like operation portion 191 at its upper end portion, and a convex engaged portion 192 is extended corresponding to an engagement portion 152 formed in the middle of the joint connector 15 at its lower end portion.

Thereby, the nut member 19 is formed separately from the joint connector 15. If the operation portion 19 is rotated, screwed around a threaded portion 23 of a ferrule portion 22 of the feed connection portion 21, and fastened in a state where the joint connector 15 is attached in the feed connection portion 21 of the electric reel 20, its side wall is moved and guided in a reel direction along the mounting hole portion 121 of the lid portion 12, so that its engaged portion 192 is engaged by the engagement portion 152 of the joint connector 15. When the nut member 19 provided in the case main body 10 is rotated, the side wall 194 of the nut member 19 comes into contact with an inner face of the mounting hole portion 121, and is supported, whereby the nut member 19 of the holding means is stably operated. Herein, if the nut member 19 is further moved in the reel direction, the engagement portion 152 is pressed in the reel direction to electrically connect the joint connector 15 to the feed connection portion 21 securely, whereby the nut member 19 is completely screwed around the threaded portion 23 of the ferrule portion 22 of the feed connection portion 21.

Herein, the case main body 10 is mounted to be suspended from the electric reel 20 via the nut member 19 in a state where the joint connector 15 is protected by the nut member 19. In this state, the joint connector 15 is inserted through the inside of the nut member 19, and prevented from getting rid of the case main body 10, because the engaged portion 192 extending from the lower end of the side wall 194 to the inside is engaged by the engagement portion 152 of the joint connector 15. Since the side wall 194 of the nut member 19 is surrounded by the cylindrical portion 123 of the case main body 10, the case main body 10 is securely mounted on the electric reel 20, and prevented from slipping off the electric reel 20.

Herein, the nut member 19 is screwed around the threaded portion 23 of the ferrule portion 22 of the feed connection portion 21 in the electric reel 20, as the engaged portion 192 is moved and guided along the side wall of the joint connector 15, in which the nut member 19 is moved from a state where the lower end of the side wall 194 in natural condition makes contact with a step portion 121 of the mounting hole portion 121 till the engaged portion 192 makes contact with the engagement portion 152 of the joint connector 15. However, mutual sliding may be possible, or selective contact and sliding may be possible owing to deformation of material employing the flexibility.

The electric reel 20 supplied with electric power via the joint connector 15 of the case main body 10 is internally fitted with a control portion composed of a spool, a spool drive motor and a microcomputer, not shown. If electric power is supplied to the feed connection portion 21, the spool drive motor can be driven, but the control portion (not shown) controls the driving of the spool drive motor (not shown) and controls the rotation speed of the spool (not shown) and the winding speed of fishline.

That is, the feed connection portion 21 is formed with a waterproof structure in which the metallic ferrule portion 22 with the threaded portion 23 is opened vertically and downward in a state where the electric reel 20 is mounted on the fishing rod 30. Within this ferrule portion 22, one pair of pin-type convex connection terminals 24 projects corresponding to one pair of concave connection terminals 151 of the joint connector 14 in the case main body 10. Thereby, the feed connection portion 21 of the electric reel 20 is electrically connected mutually, because its ferrule portion 22 is inserted into the concave connection terminals 151 of the joint connector 15, if the joint connector 15 of the case main body 10 is inserted.

Herein, the feed connection portion 21 is disposed with a seal structure within its ferrule portion 22, and thereby formed into a so-called liquid tight structure of preventing fluid such as water from entering from the ferrule portion 22 and its peripheral portion into the electric reel 20. The ferrule portion 22 of the feed connection portion 21 is connected in a strong integral structure while maintaining a liquid tight structure with the joint connector 15 of the case main body 10, preventing water from entering from this feed connection portion 21 into the electric reel 20, and preventing its separation, because if the nut member 19 of the case main body 10 is screwed around the threaded portion 23 on the periphery, the metallic nut member 19 (holding means) is screwed to cover the periphery of the opening of the feed connection portion 21 serving as the connection portion between the joint connector 15 and the feed connection portion 21 which are connected.

A base end portion of the elastic arm portion 25 made of non-conductive resin material is supported elastically deformably in the feed connection portion 21 of the electric reel 20. At the distal end of this elastic arm portion 25, a non-conductive protection cap 251 is provided corresponding to the ferrule portion 22. Thereby, when the electric reel 20 is not used, its ferrule portion 22 and the convex connection terminal 24 are protected by putting the protection cap 251 on the ferrule portion 22 of the feed connection portion 21.

The feed connection portion 21 of the electric reel 20 formed in this way may be connected with a cable connector of the feeding cord, not shown, wired and connected to the battery device of external installation type, instead of the joint connector 15 of the case main body 10, and thereby supplied with electric power from the battery device of external installation type.

Figure 3:
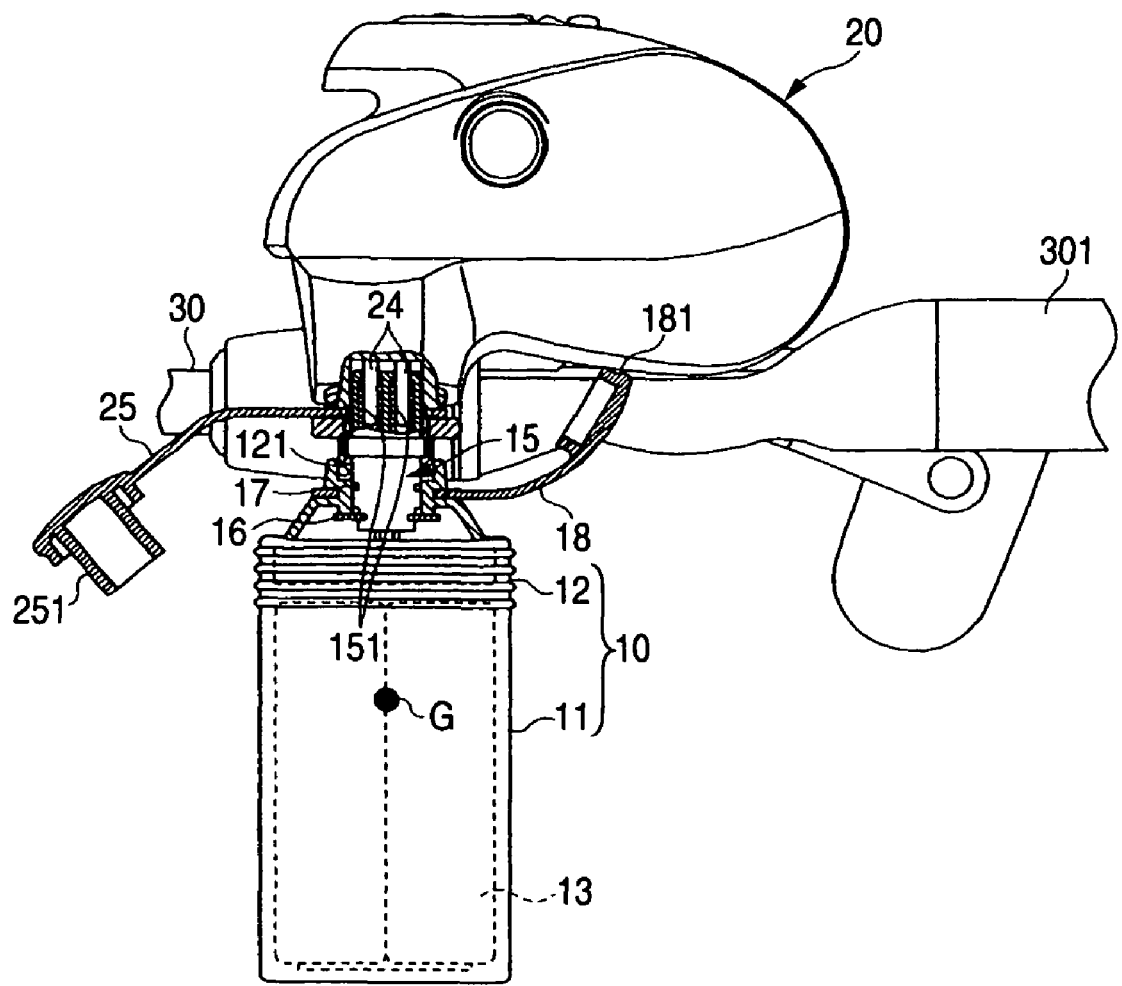
FIG. 3 is a partial cross-sectional view showing a state where the case main body of FIG. 1 is attached to the electric reel.

With the above constitution, the convex connection terminals 24 within the ferrule portion 22 are inserted into the concave connection terminals 151 and the case main body 10 is electrically connected mutually when the joint connector 15 is attached to the ferrule portion 22 of the feed connection portion 21 in the electric reel 20 mounted on the fishing rod 30. Herein, if the operation portion 191 of the nut member 19 is rotated to screw the nut member 19 around the threaded portion 23 of the ferrule portion 22 in the electric reel 20, and fastened, the side wall 194 of the number member 19 is moved and guided in the reel direction along the mounting hole portion 121 of the lid portion 12, whereby the case main body 10 is mounted to the ferrule portion 22 of the electric reel 20 in a state where its engaged portion 192 is engaged by the engagement portion 152 of the joint connector 15 and pressed in the same direction (see FIGS. 3 and 4).

The nut member 19 is attached to the case main body 10 by thrusting the lower end of the side wall 194 into the cylindrical portion 123 from the opening 124 of the case main body 10. Since the joint connector 15 is inserted into the inside of the nut member 19, the side wall 194 is disposed in a gap between the cylindrical portion 123 and the joint connector 15 within the mounting hole portion 121 of the cylindrical portion 123. Accordingly, when the nut member 19 is operated, the mounting hole portion 121 of the cylindrical portion 123, namely, an inner wall of the cylindrical portion 123 serves as a guide portion, so that the nut member 19 (side wall 194) is moved up and down or rotated along this inner wall. Hence, the side wall 194 of the nut member 19 makes contact with the inner wall (mounting hole portion 121) of the cylindrical portion 123 for the case main body 10 and is moved along the inner wall of the cylindrical portion 123 at any time or when the joint connector 15 is distorted, whereby the working at the time of operation is orientated, enabling the stable operation. Further, an unprepared looseness of the nut member 19 against the vibration is prevented in a mounted state on the electric reel 20. And the joint connector 15 is inserted into the inside of the nut member 19, and the engaged portion 129 is guided along the joint connector 15 to be moved up and down or rotated, whereby the movement of the nut member 19 is oriented from both its inside and outside, enabling the stable operation. Even if the nut member 19 is moved upward, and engaged by the engagement portion 152, the lower end of the side wall 194 is surrounded by the cylindrical portion 123, and slid with the inside of the cylindrical portion 123, if the nut member 19 is rotated.

In this way, if the guide portion for guiding the motion of the case main body 10 by contacting it lies in the case main body 10 in operating the holding member or rotating the nut member 19, the holding member (nut member 19) is less unsteady to stabilize the working, making the operation easier, and preventing the looseness of the holding member (nut member 19) in the held state.

Thereby, the case main body 10 is mounted directly on the electric reel 20, without employing the feeding cord, in a state where a single joint connector 15 protruding upward from the center of gravity G in the almost middle of its upper face is attached to the feed connection portion 21 of the electric reel 20 not to drop out, suspended in balance and assembled to the electric reel 20.

And the angler grasps a grip portion 301 of the fishing rod 30 and the electric reel 20 in a mounted state of this case main body on the electric reel 20, and performs a rod operation while directly supporting the case main body 10. Since the joint connector 15 is formed of a softer material than the material forming the case main body 10, and has greater flexibility than the case main body 10, even if a force for swinging the battery device for fishing attached to the electric reel 20 is exerted due to a decoy of flapping the fishing rod up and down, or a fishing operation of winding the line around the electric reel 20, the joint connector 15 is flexed to relieve the vibration. Therefore, with less rattle of mounting on the electric reel 20, the joint connector 15 of the battery device for fishing is prevented from being damaged or broken to withstand the uses in the severe fishing environments. Since the joint connector 15 is formed of a softer material than the case main body 10, and has greater flexibility than the case main body 10, a fixture portion of the joint connector 15 to the case main body 10, the case main body 10, and the feed connection portion 21 of the electric reel 20 to which the battery device for fishing is attached are less subject to breakage. In operating the rod, the joint connector 15 is arranged on a mounting plane passing through the center of gravity G of the case main body 10, and provided to protrude upward of the case main body 10 above the center of gravity G, whereby its load is minimum. From this point, the joint connector 15 is prevented from being broken.

On the other hand, since the case main body 10 is formed of synthetic resin that is less flexible and harder material than the joint connector 15, even if the joint connector 15 having greater flexibility is flexed, the distortion of the case main body 10 is reduced, whereby the joint connector 15 is securely held, and the vibration or distortion of the whole battery device for fishing against the electric reel 20 is prevented. Moreover, since the breakage of the case main body 10 is prevented corresponding to the load from the outside when struck against other obstacles, the cell main body 13 stored inside can be protected. The cell main body 13 stored inside can not be taken out to protect it, and a joint portion between the storage portion 11 and the lid portion 12 is welded to prevent water from entering, whereby the cell main body 13 is tightly stored within the case main body 10.

The joint connector 15 is inserted through the inside of the nut member 19 of the holding means, the joint connector 15 inside the nut member 19 and the case main body 10 (cylindrical portion 123) outside the nut member 19 surround the nut member 19. The nut member 19 as the holding means is held in the battery device for fishing adjacently to or partially contact with the joint connector 15 and the case main body 10. Since the rotational operation of the nut member 19 is made while sliding with the joint connector 15 and the case main body 10 (cylindrical portion 123), the battery device can be mounted stably in the feed connection portion 21 of the electric reel 20 by deriving the rotational direction. In a state where the battery device is mounted in the feed connection portion 21 of the electric reel 20, the nut member 19 of the holding means has its inside contact with the outside of the joint connector 15, with its outside contact with the case main body 10 (cylindrical portion 123) or contacted by the case main body 10 (cylindrical portion 123) when at least the joint connector 15 is flexed due to its flexibility.

Accordingly, even if the battery device for fishing is vibrated by the fishing operation, its vibration is relieved, and the looseness of the nut member 19 against the feed connection portion 21 of the electric reel 20 is prevented. Since the vibration of the case main body 10 is relieved when the nut member 19 and the case main body 10 (cylindrical portion 123) are contacted, the mounted state of the joint connector 15 on the case main body 10 (cylindrical portion 123) is maintained, whereby this portion is prevented from being peeled or broken. Since the nut member 19 is formed of a harder material than the joint connector 15, the flexure of the joint connector is relieved by contact of the nut member 19.

The nut member 19 can be moved up and down along the joint connector 15, but the engagement portion 152 may be provided further downward so that the nut member 19 is only revolved but not moved up and down. In this case, at least a lower portion of the nut member 19 is formed to be surrounded by the case main body 10 (cylindrical portion 123). The nut member 19 of the holding member provided above the case main body 10 is formed not to extend in its circumferential direction beyond the case main body 10, thereby preventing inadvertent touch or breakage during the fishing, or the mounting on the electric reel 20 from being loosened. The cylindrical portion 123 of the case main body 10 is formed in smaller diameter than the storage portion 11a, but an inclined portion is formed between the cylindrical portion 123 and the storage portion 11a by gradually reducing the diameter of the case main body 10 from the storage portion 11a to the cylindrical portion 123, preventing the breakage between the storage portion 11a and the cylindrical portion 123.

Herein, a holding space in the fishing rod 30 can be handled integrally with the electric reel 20 by making an up and down decoy operation or a winding operation in a so-called feeling on hand, without restriction, almost like the normal manual fishing reel. Since the joint connector 15 is fixed to the case main body 10, and the case main body 15 is prevented from getting rid of the electric reel 20 by the holding means, the angler can conduct the desired fishing operation comfortably without being hindered by the case main body 10, and the battery device for fishing is prevented from being broken.

When electric energy of the cell main body 13 within the case main body 10 is exhausted in the course of fishing, the case main body is detached from the electric reel 20 by making a reverse operation to the attaching operation. Then, the battery is exchanged by the new battery that is prepared and already charged, whereby the electric reel 20 can be employed for the long time. In this way, the cell main body is so lightweight that the angler can make the fishing holding it together with the electric reel 20, and easily carry it portably. The weight of this battery device for fishing may be 500 g or less in use, but preferably 300 g or less for the general angler to conduct the fishing half day without fatigue, or 30 g or less in some cases.

Thus, in this battery device for fishing, the cell main body 13 and the control portion 14 are tightly stored within the case main body 10, the case main body 10 is provided with the joint connector 15 electrically connected to the cell main body 13 and the control portion 14, the nut member 15 is disposed to surround the joint connector 15, the joint connector 15 is attached for feeding to the feed connection portion 21 for external power source connection in the electric reel 20, and the nut member 19 is screwed around the ferrule portion 22 of the feed connection portion 21, whereby the case main body 10 is mounted on the electric reel 20 in a state where the engaged portion 192 of the nut member 15 is engaged in the engagement portion 152 of the joint connector 15.

With this constitution, the case main body 10 is mounted via the nut member 19 on the electric reel 20 in a state where the joint connector 15 is electrically connected to the feed connection portion 21 of the electric reel 20, whereby the joint connector 15 is securely protected, and the case main body 10 and the electric reel 20 are electrically connected securely and assembled tightly.

That is, the nut member 19 is fitted rotatably and provided in the case main body 10, its engaged portion 192 being engaged in the engagement portion 152 of the joint connector 15, and prevented from getting rid of the case main body 10, whereby the case main body 10 is stoutly attached on the electric reel 20. As a result, a simple and easy mounting or dismounting operation is realized even in the severe fishing environments making it possible to withstand the relatively violent rod operation. The battery device for fishing is maintained by the feed connection portion 21 of the electric reel 20 and the holding means of the nut member 19, and prevented from dropping out, even if it is vibrated due to flexibility of the joint connector 15. Therefore, the angler can conduct the desired fishing operation comfortably without being hindered by the case main body 10.

The joint connector 15 can take various configurations in accordance with the feed connection portion 21 of the electric reel 20 to be mounted, and is convex in this embodiment, or may be formed of a connection terminal alone. Further, the connection terminal may take various configurations such as concave or convex form, and one or more connection terminals may be provided.

Figure 4:
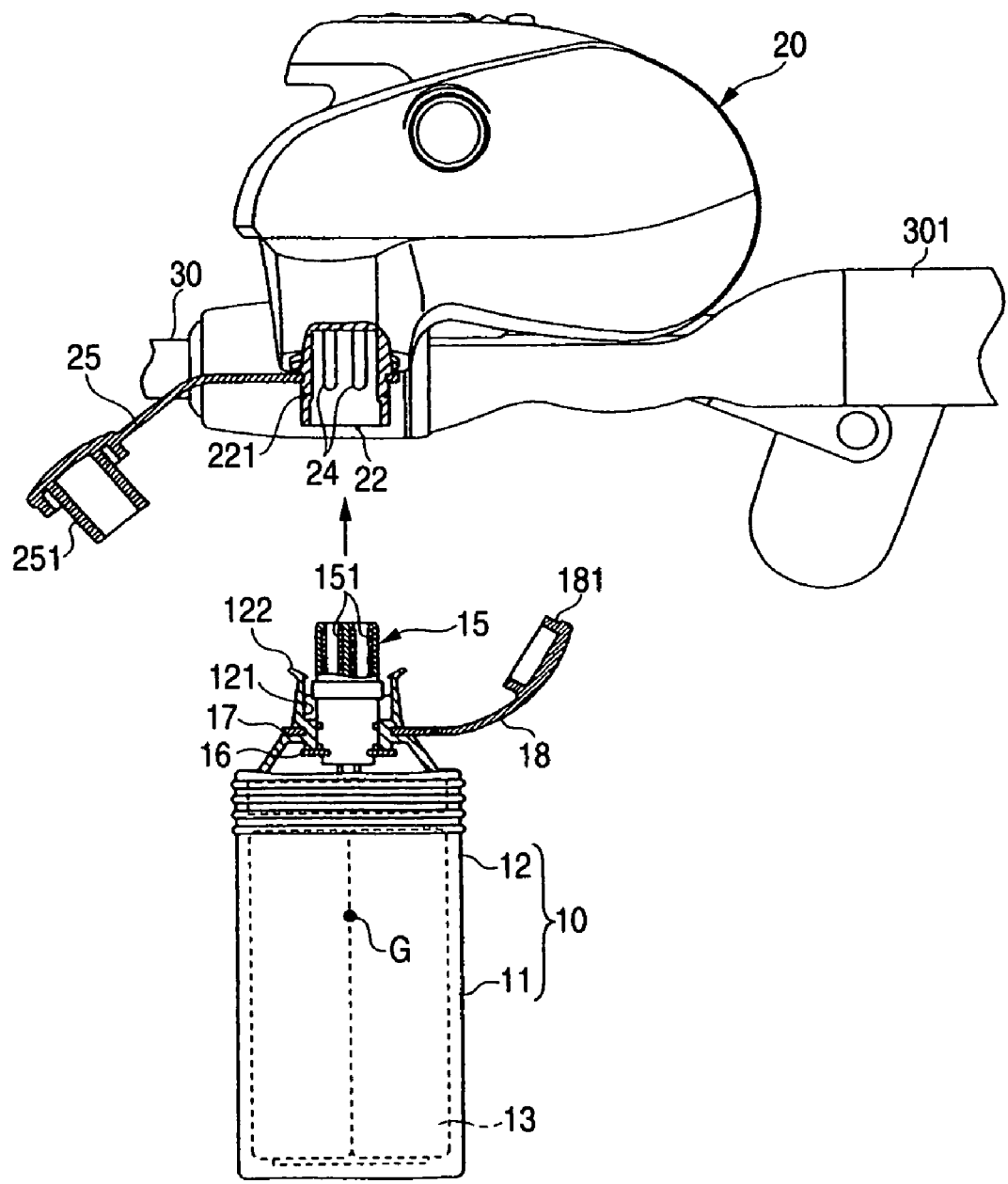
FIG. 4 is a partial cross-sectional view showing a battery device for fishing according to a second embodiment of the invention.
Figure 5:
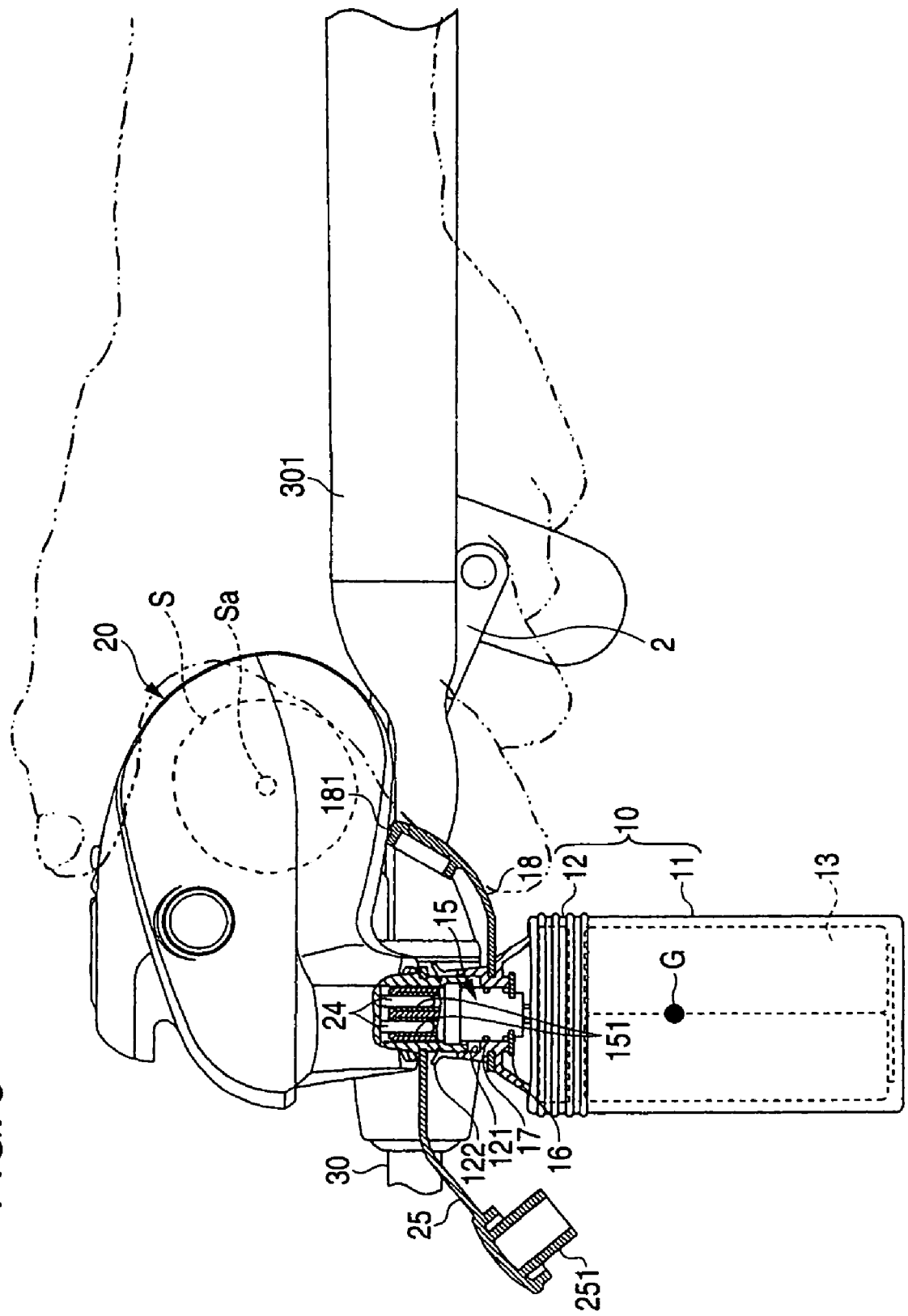
FIG. 5 is a partial cross-sectional view showing a state where the case main body of FIG. 4 is attached to the electric reel.
Figure 6:
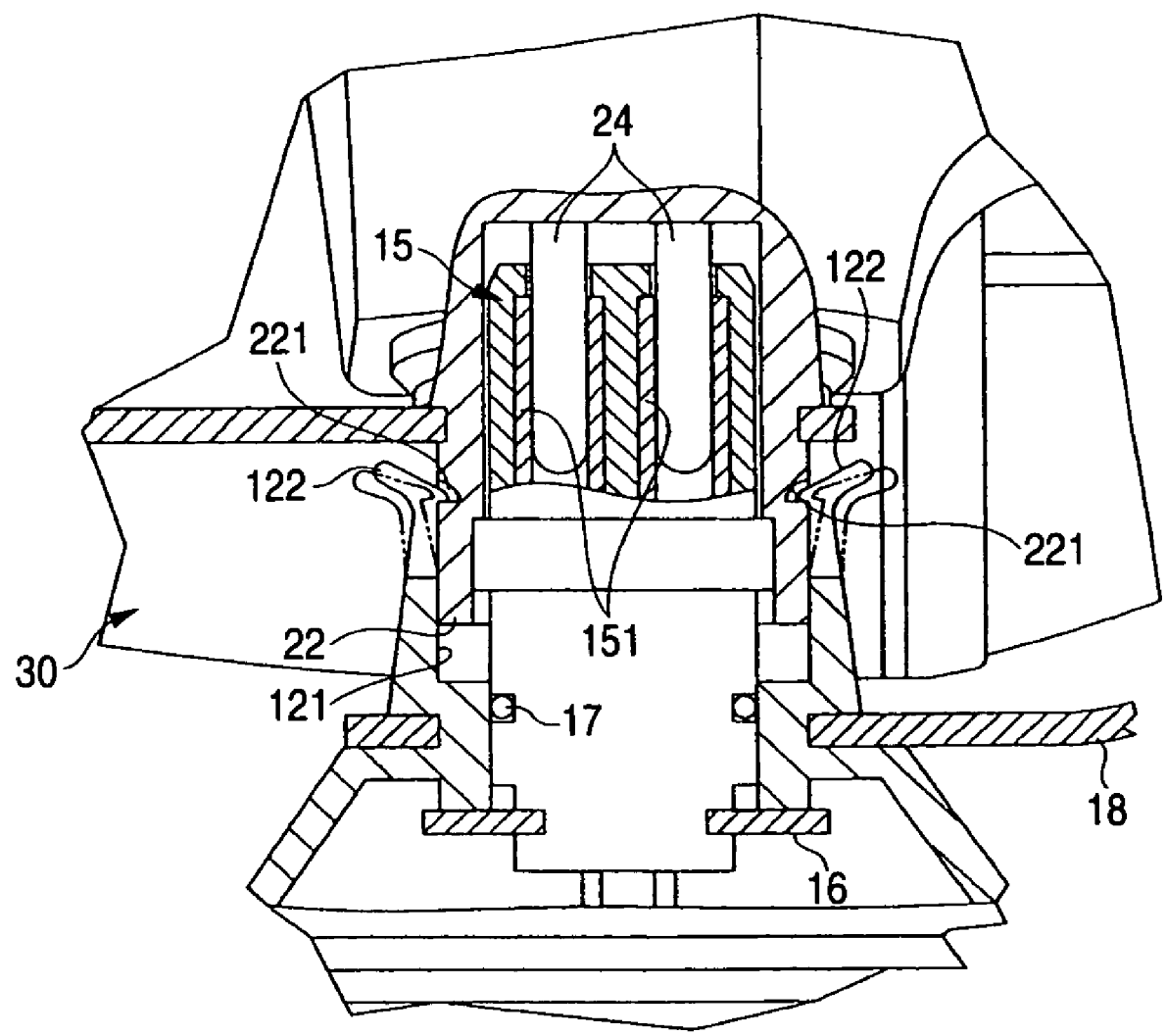
FIG. 6 is a partial cross-sectional view showing the essence of FIG. 5 in larger scale.
Figure 7:
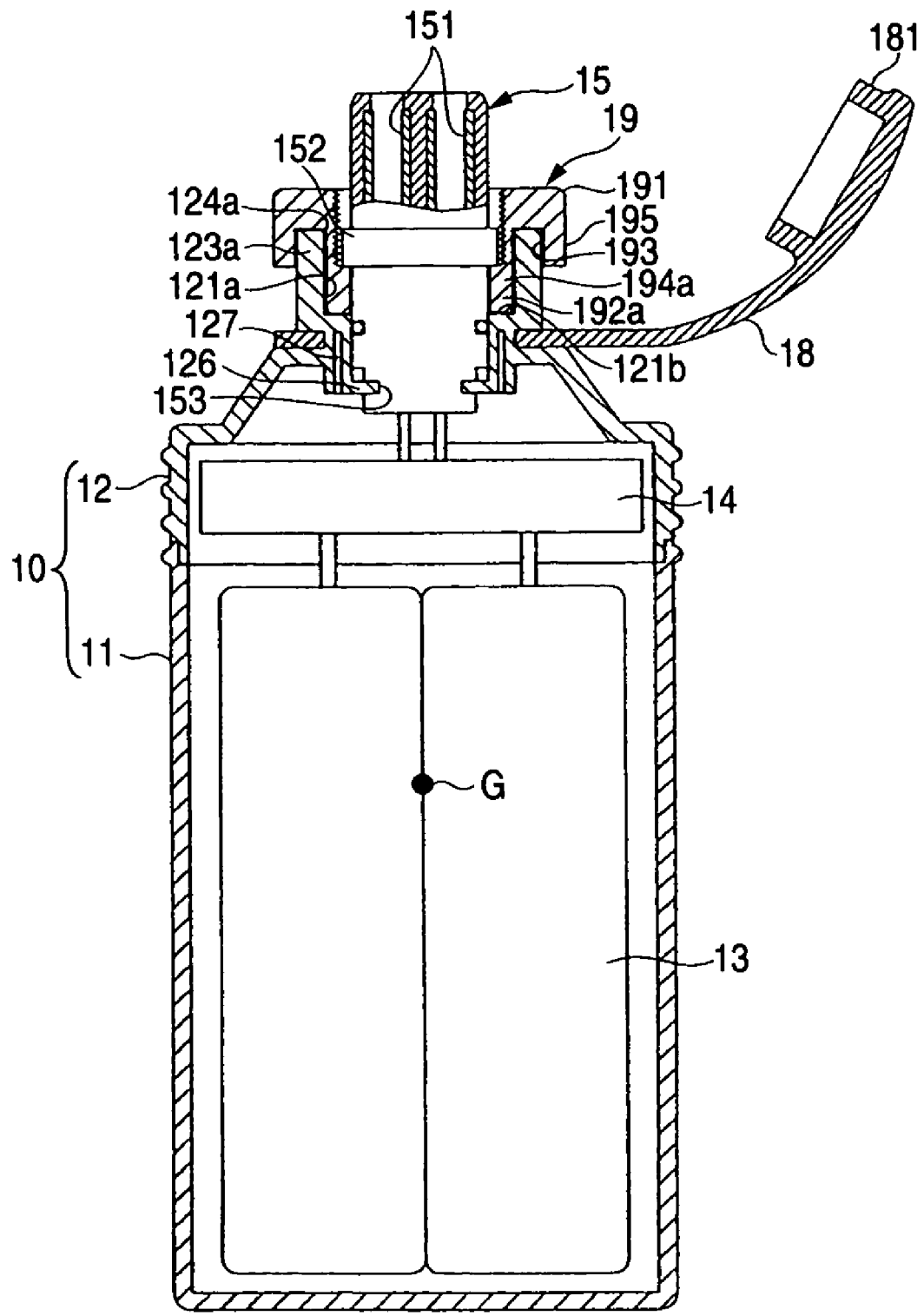
FIG. 7 is a cross-sectional view showing a battery device for fishing according to a third embodiment of the invention.
Figure 8:
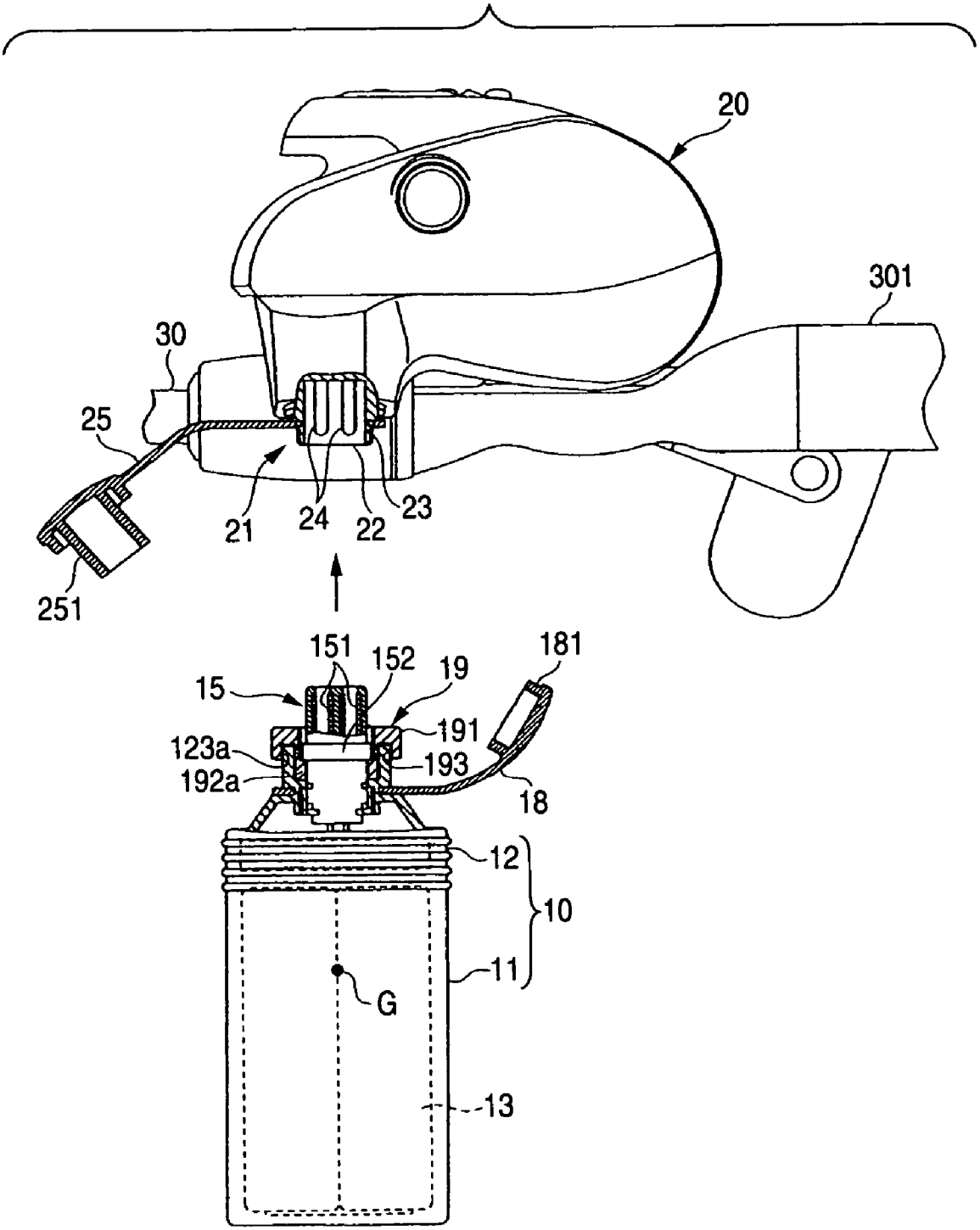
FIG. 8 is a partial cross-sectional view showing a state before the case main body of FIG. 7 is attached to the electric reel.
Figure 9:
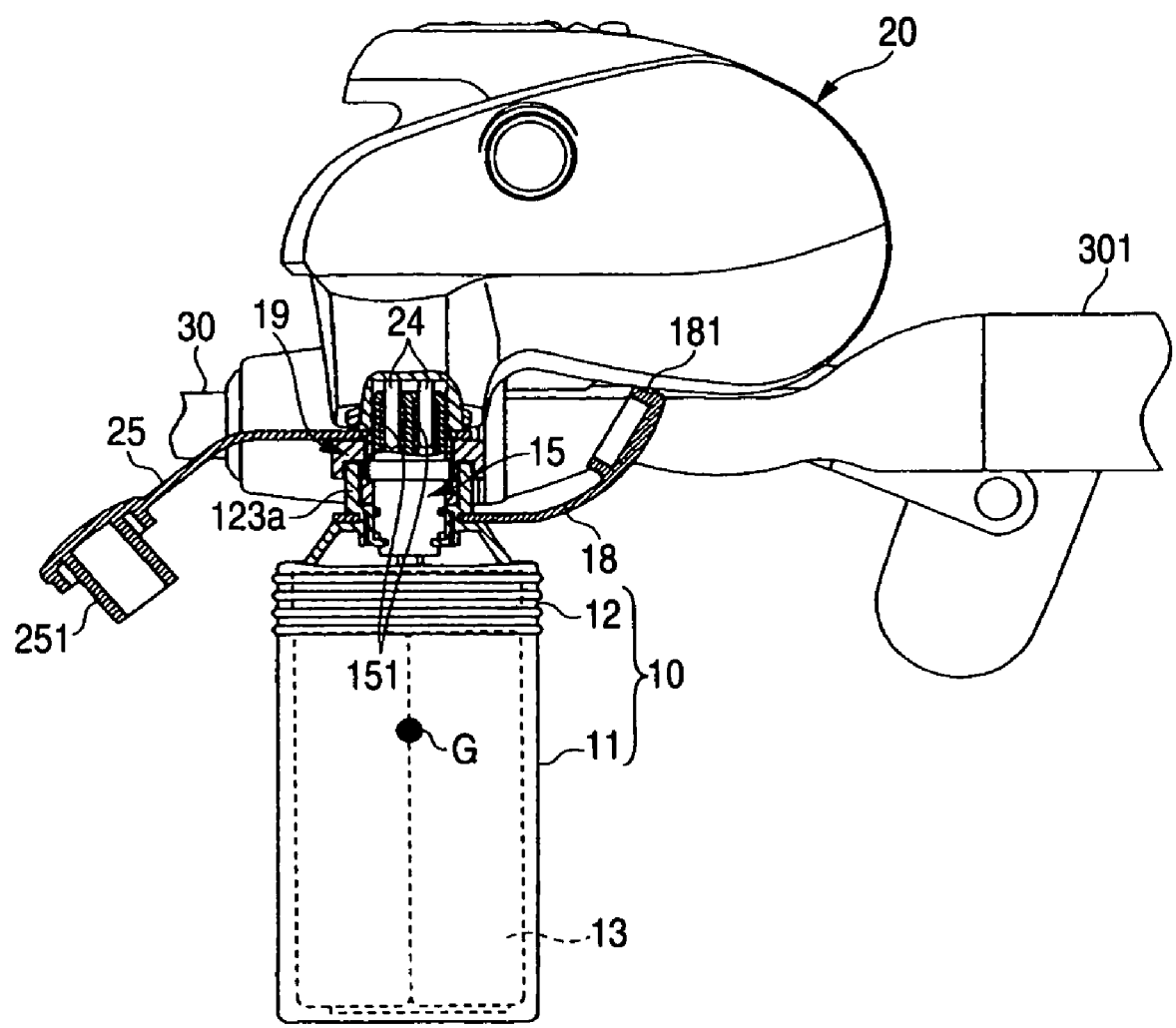
FIG. 9 is a partial cross-sectional view showing a state where the case main body of FIG. 7 is attached to the electric reel.
Figure 10:
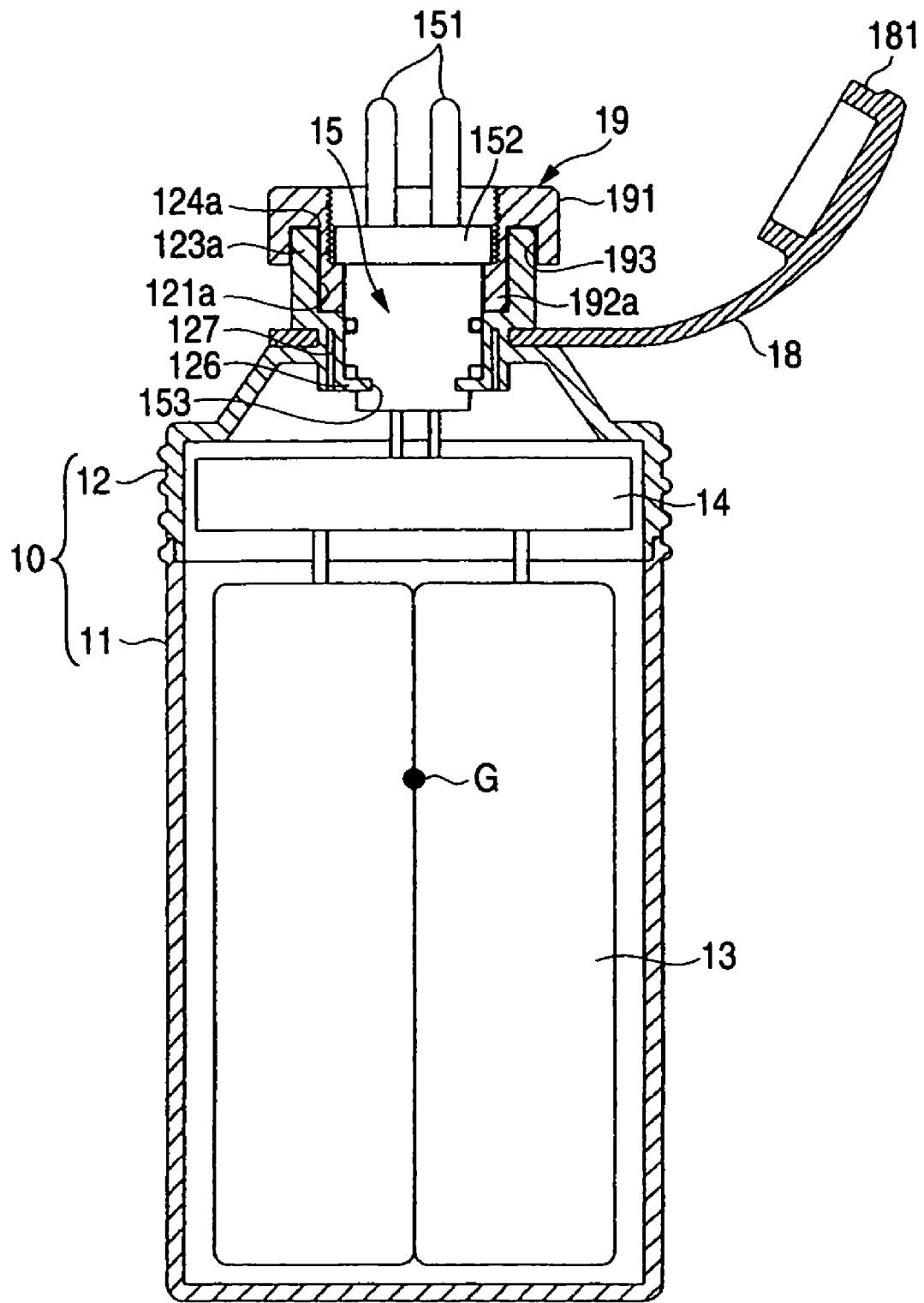
FIG. 10 is a cross-sectional view showing a battery device for fishing according to a fourth embodiment of the invention.
Figure 11:
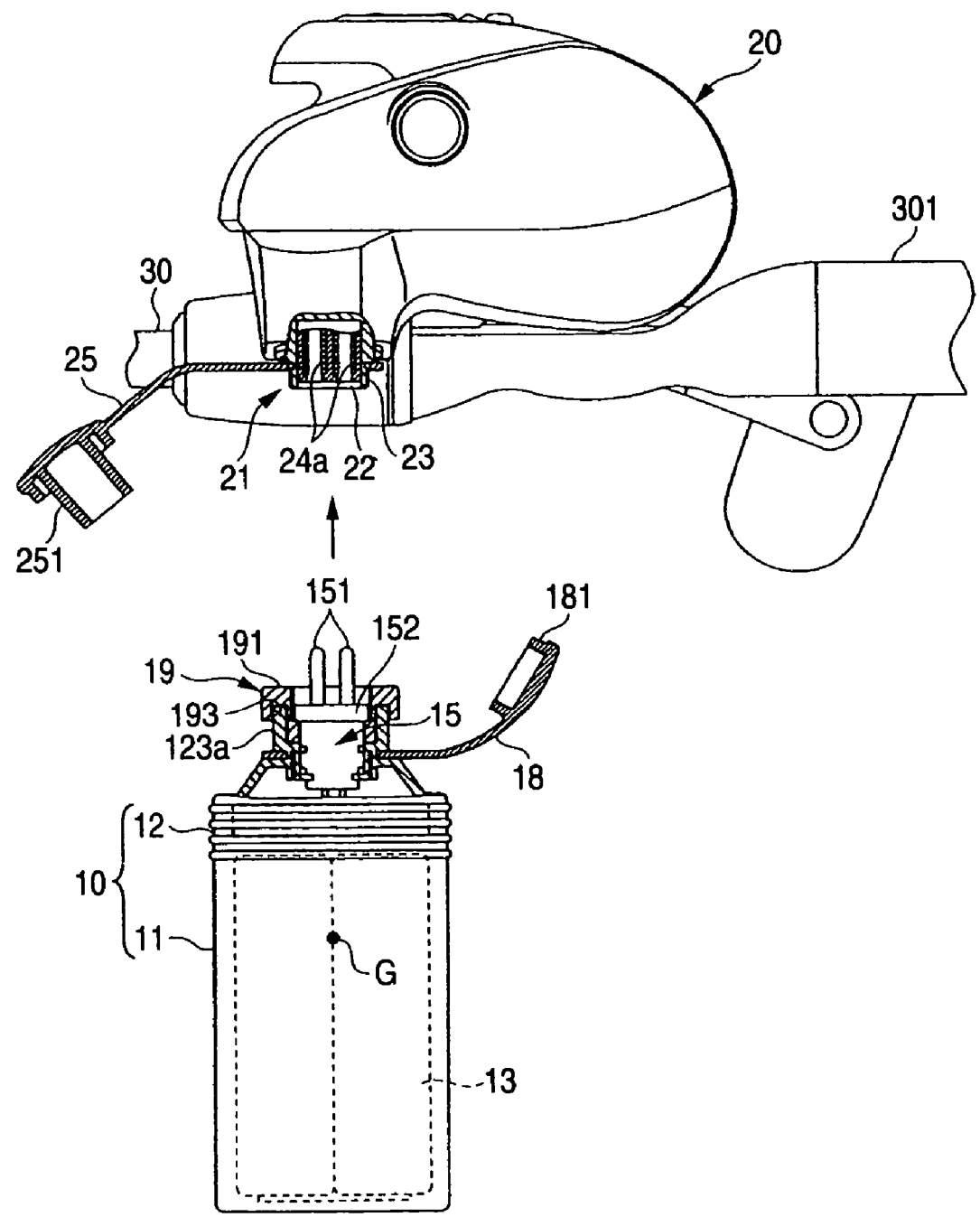
FIG. 11 is a partial cross-sectional view showing a state before the case main body of FIG. 10 is attached to the electric reel.
Figure 12:
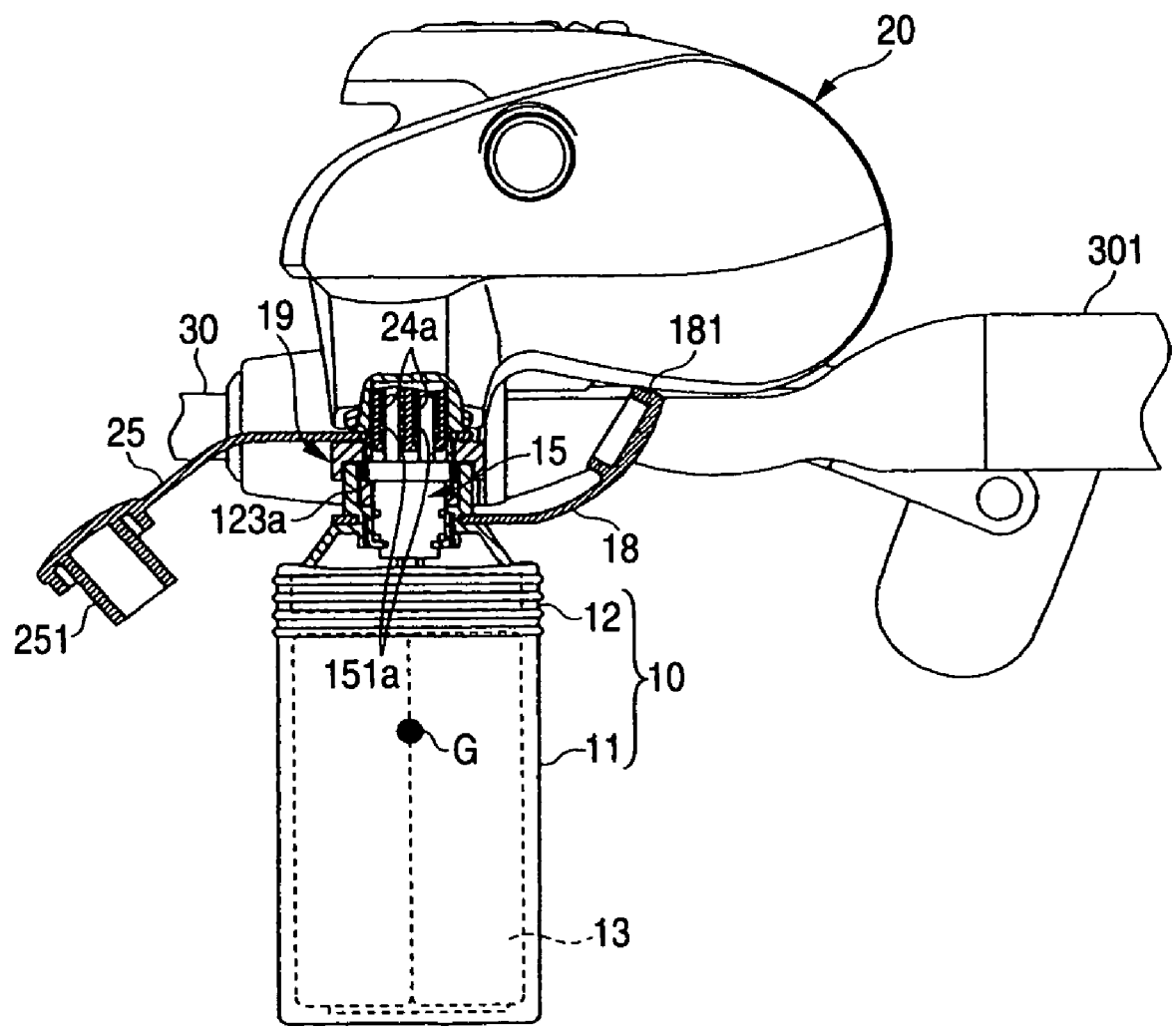
FIG. 12 is a partial cross-sectional view showing a state where the case main body of FIG. 10 is attached to the electric reel.
Figure 13:
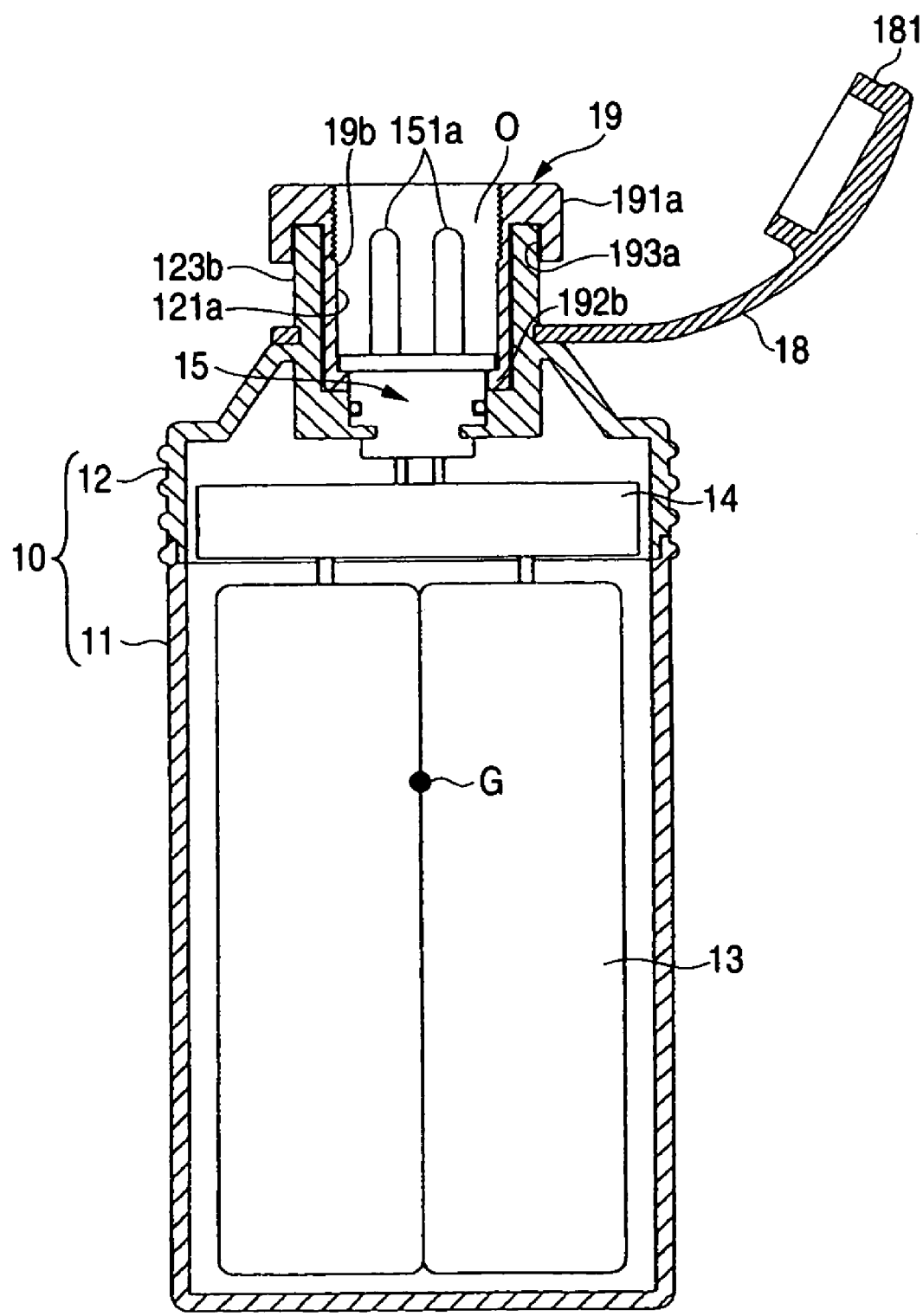
FIG. 13 is a cross-sectional view showing a battery device for fishing according to a fifth embodiment of the invention.
Figure 14:
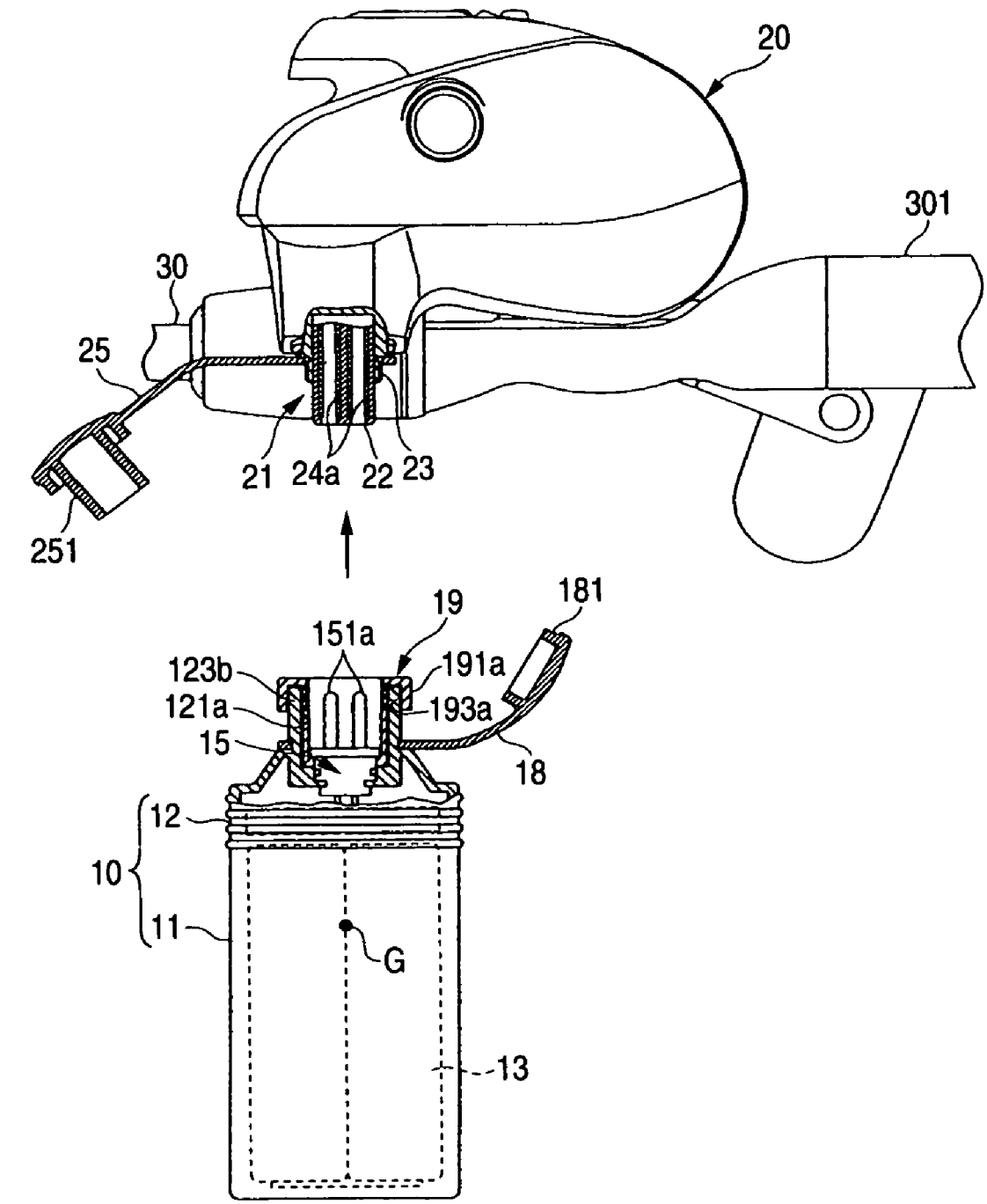
FIG. 14 is a partial cross-sectional view showing a state before the case main body of FIG. 13 is attached to the electric reel.
Figure 15:
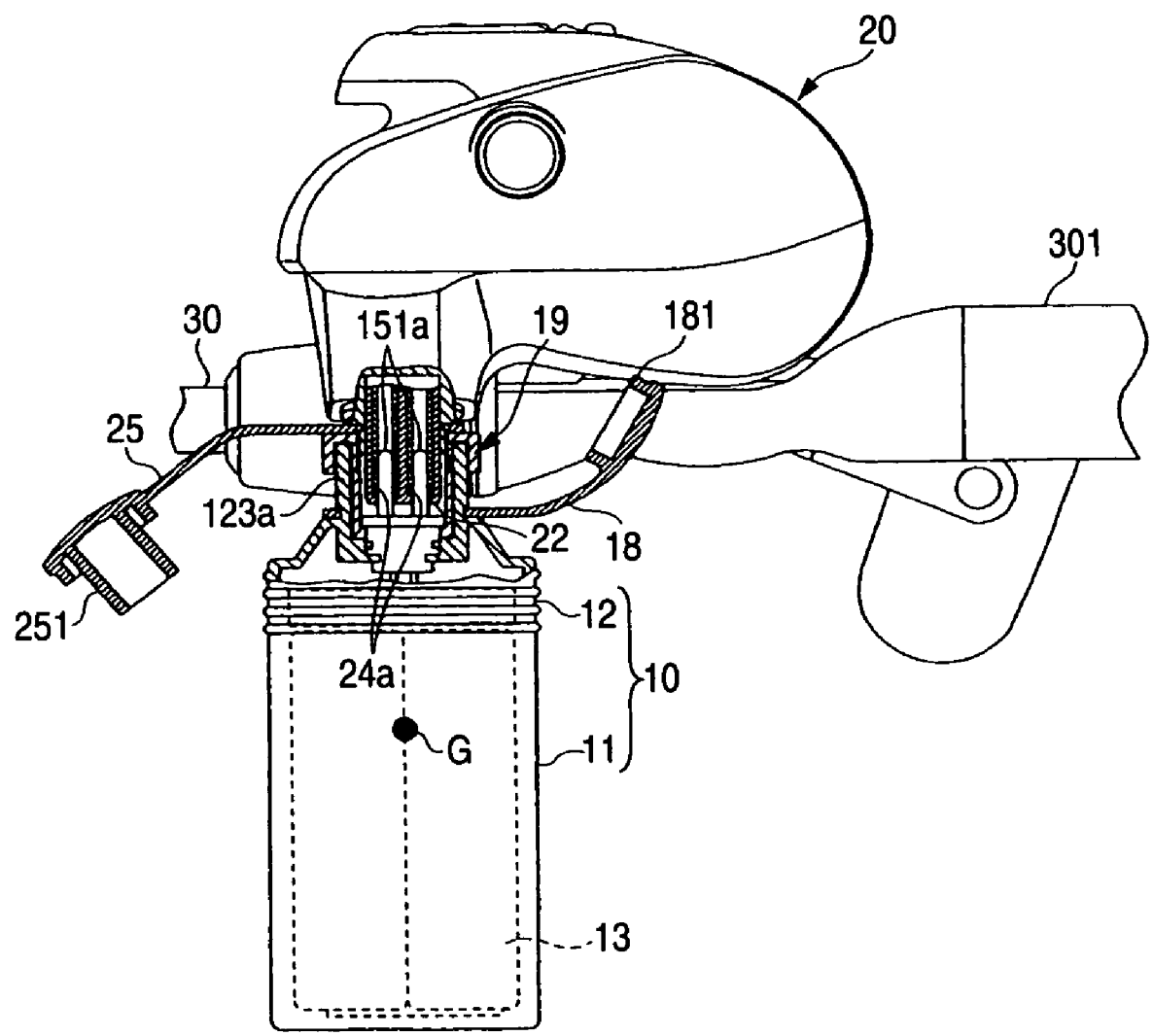
FIG. 15 is a partial cross-sectional view showing a state where the case main body of FIG. 14 is attached to the electric reel.
Figure 16:
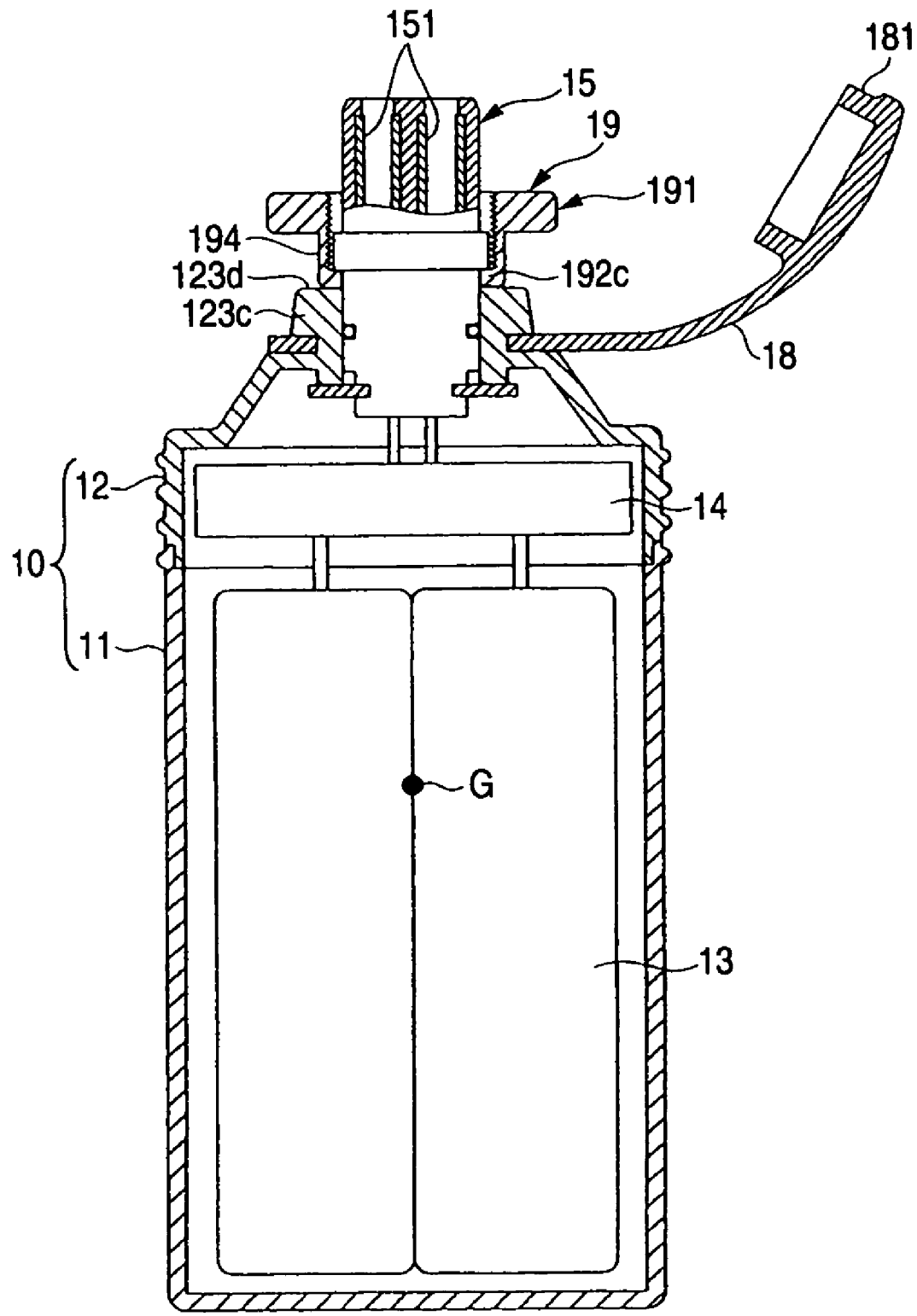
FIG. 16 is a cross-sectional view showing a battery device for fishing according to a sixth embodiment of the invention.
Figure 17:
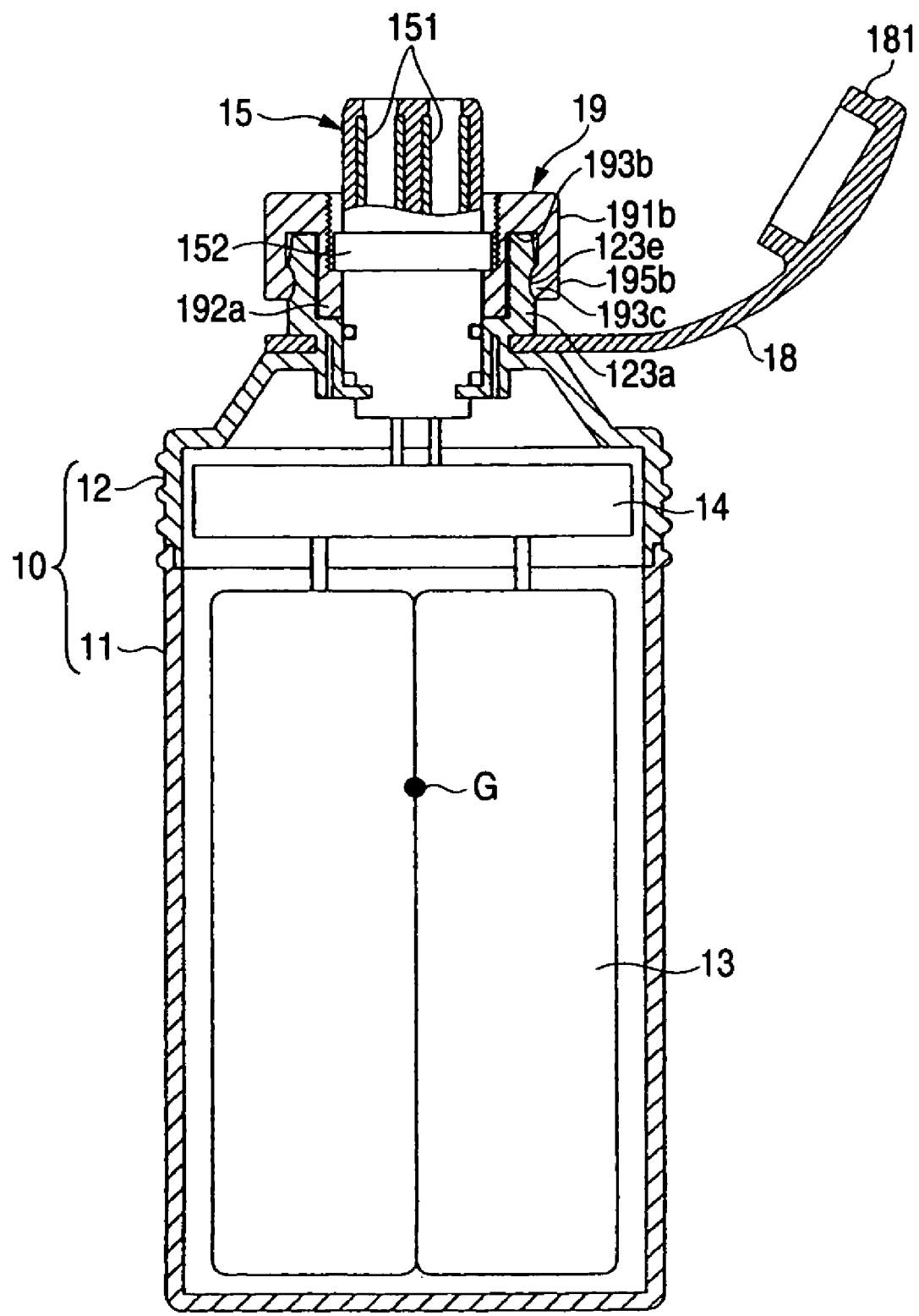
FIG. 17 is a cross-sectional view showing a battery device for fishing according to a seventh embodiment of the invention.
Figure 18:
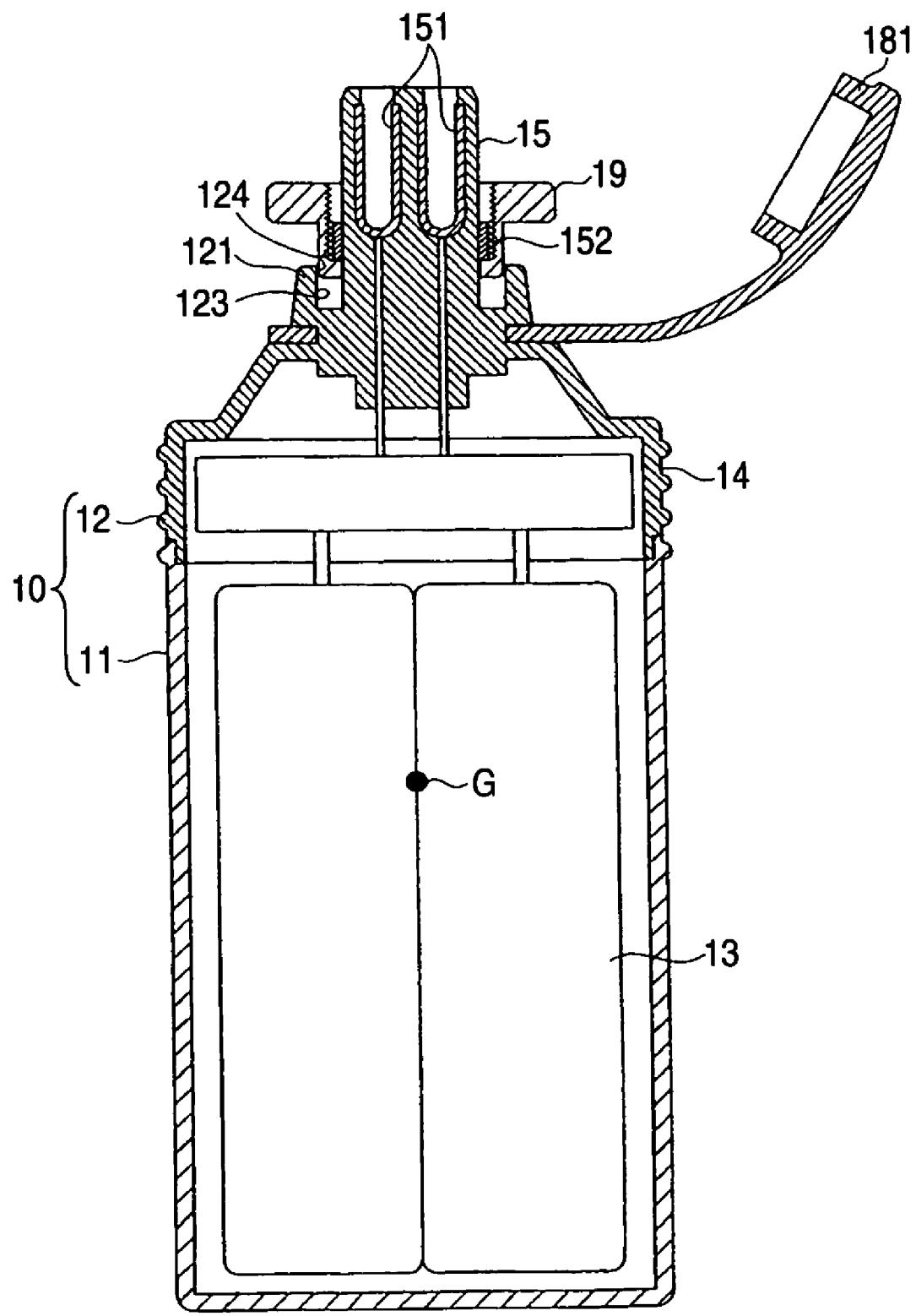
FIG. 18 is a cross-sectional view showing a battery device for fishing according to an eight embodiment of the invention.
Figure 19:
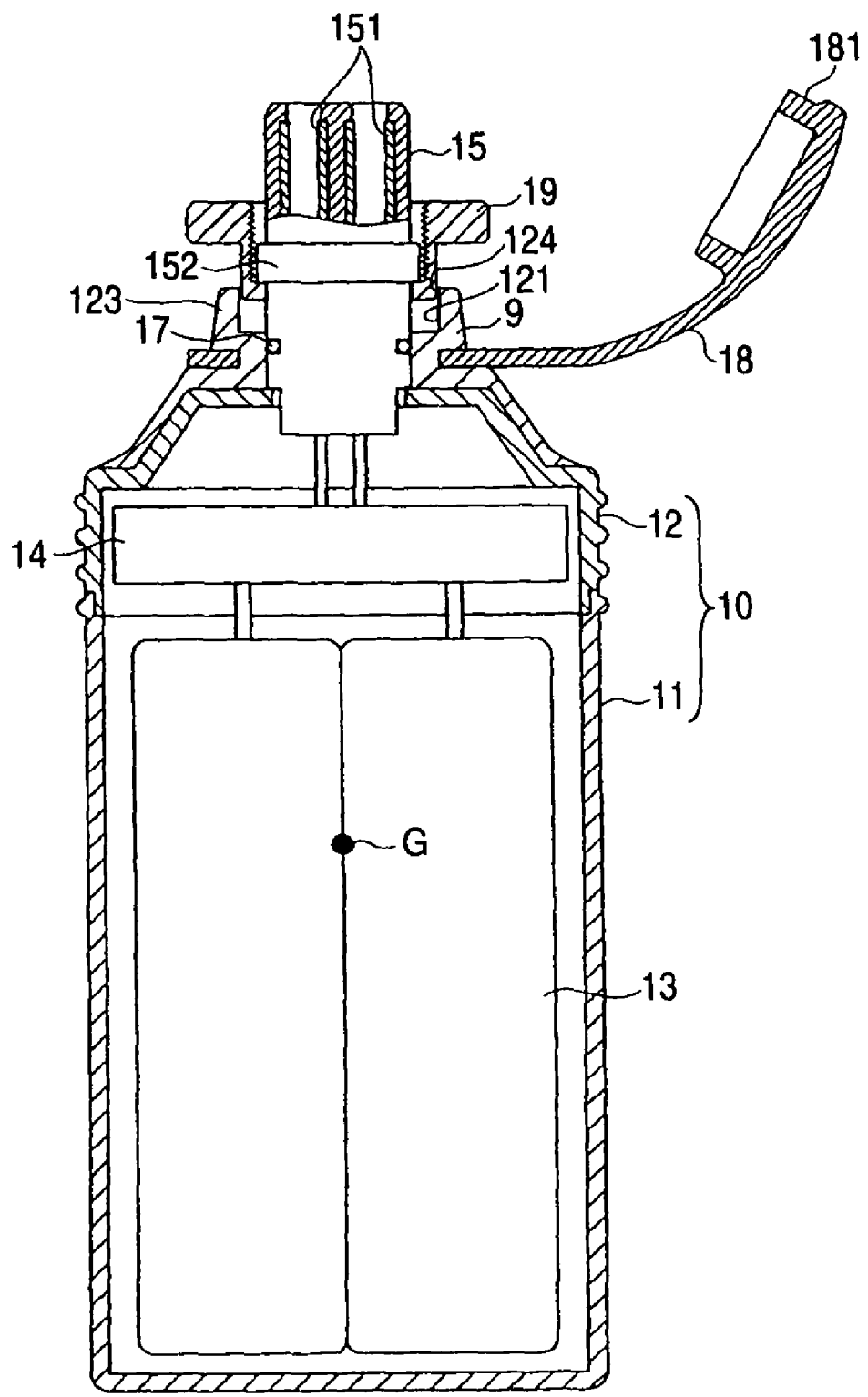
FIG. 19 is a cross-sectional view showing a battery device for fishing according to a ninth embodiment of the invention.

This invention is not limited to the first embodiment, but besides, may be constituted according to a second embodiment as shown in FIGS. 4 to 6, a third embodiment as shown in FIGS. 7 to 9, a fourth embodiment as shown in FIGS. 10 to 12, a fifth embodiment as shown in FIGS. 13 to 15, a sixth embodiment as shown in FIG. 16, a seventh embodiment as shown in FIG. 17, a eighth embodiment as shown in FIG. 18, and a ninth embodiment as shown in FIG. 19. In any of the embodiments, the same effects of the first embodiment can be expected. In FIGS. 4 to 17, the same or like parts are designated by the same reference numerals as in FIGS. 1 to 3, and not described in detail.

Second Embodiment

First of all, in the second embodiment as shown in FIGS. 4 to 6, as holding means for mounting the case main body 10 on the feed connection portion 21 of the electric reel 20 not to break away, a plurality of elastic engaged portions 122 are provided at regular intervals around the mounting hole portion 121 of the lid portion 12 in the case main body 10. On the other hand, the ferrule portion 22 of the feed connection portion 21 in the electric reel 20 is provided with a plurality of concave engaged portions 221 corresponding to the plurality of elastic engaged portions 122.

With the above constitution, the case main body 10 is electrically connected mutually in such a way that if the joint connector 15 is inserted through the ferrule portion 22 of the feed connection portion 21 for the electric reel 20 mounted on the fishing rod 30, the convex connection terminals 24 within the ferrule portion 22 are inserted into the concave connection terminals 151. At the same time, the elastic engaged portion 122 of the lid portion 12 is elastically engaged in the concave engaged portion 221 of the ferrule portion 22 of the feed connection portion 21 for the electric reel 20 due to its elastic force, so that the case main body 10 is mounted to the ferrule portion 22 of the electric reel 20 (see FIGS. 5 ad 6). The elastic engaged portion 122 (holding means) of the second embodiment may not have the concave engaged portion 221, but is engaged and stopped in the irregularities of the threaded portion 23, unlike the feed connection portion 21 of the electric reel 20 of the first embodiment.

With this second embodiment, the operability of mounting or dismounting the battery is improved, and the handling operation is facilitated.

Third Embodiment

In the third embodiment as shown in FIGS. 7 to 9, the operation portion 191 of the nut member 19 is formed with a skirt portion 195 provided to hang down along its outer periphery, covering the outer periphery of the cylindrical portion 123, and forming a ring-like concave portion 193 along the skirt portion 195 inside the skirt portion 195 of the operation portion 191, corresponding to the cylindrical portion 123a provided in the lid portion 12. The opening 124a of the cylindrical portion 123a of the lid portion 12 is rotatably inserted into the concave portion 193 formed between the side wall 123a of this operation portion 191 and the skirt portion 195. And at a lower end portion of the nut member 19, the engaged portion 192a is provided to be rotatably engaged in the engagement portion 152 of the joint connector 15. The joint connector 15 is formed of a softer material than the case main body 10, and has greater flexibility than the case main body 10.

The cylindrical portion 123a with the mounting hole portion 121a is formed integrally with the lid portion 12, and provided with a projection portion 126 for mounting the connector and a groove-like elastic deformation portion 127 at its lower end portion. Thereby, the cylindrical portion 123a is assembled with the joint connector 15 by inserting the projection portion 126 into a concave portion 153 at the lower end portion of the joint connector 15, employing an elastic force of the elastic deformation portion 127, so that the base end portion of the joint connector 15 is fixed by adhesives to the inside of the cylindrical portion 123a.

With the above constitution, if the operation portion 191 of the nut member 19 is rotated in a state where the case main portion 10 is mounted (see FIG. 9) by opposing and inserting the concave connection terminal 151 of the joint connector 15 into the feed connection portion 21 of the electric reel, as shown in FIG. 8, the upper end portion of the cylindrical portion 123a is rotatably inserted into the concave portion 193 of the nut member 19, and the engaged portion 192a is rotatably engaged in the engagement portion 152 of the joint connector 15 to regulate the vertical movement, whereby the case main body 10 is rotated at the assembled position, screwed around the threaded portion 23 of the ferrule portion 22 of the feed connection portion 21, and fastened. Therefore, the joint connector 16 is protected via the nut member 19, and the case main body 10 is securely connected to the feed connection portion 21 of the electric reel 20, and mounted or suspended on the electric reel 20 in a state where the nut member 19 of the holding member is rotatably fitted around the cylindrical portion 123a of the case main body 10 to guide its rotation around the cylindrical portion 123a.

The nut member 19 is rotatably fitted by thrusting the side wall 194a from the opening 124a of the case main body 10 into the cylindrical portion 123a, and thrusting the cylindrical portion 123a into the concave portion 193, and mounted to the case main body 10. Since the joint connector 15 is inserted through the inside of the nut member 19, the side wall 194a is disposed in a gap between the cylindrical portion 123a and the joint connector 15 within the mounting hole portion 121a of the cylindrical portion 123a. Accordingly, when the nut member 19 is operated, the mounting hole portion 121a of the cylindrical portion 123a, namely, the side wall of the cylindrical portion 123a serves as a guide portion, so that the nut member 19 (side wall 194a) is moved up and down or rotated along the guide portion.

Hence, the side wall 194a of the nut member 19 has its outside surrounded by the cylindrical portion 123a, makes contact with the inner wall (mounting hole portion 121a) of the cylindrical portion 123a for the case main body 10 at any time or when the joint connector 15 is distorted, and is moved along the inner wall of the cylindrical portion 123a, whereby the working at the time of operation is oriented to allow the stable operation. Further, the nut member 19 is prevented from inadvertently loosening due to vibration in the mounted state on the electric reel 20. Since the skirt portion 195 covers the outer periphery of the cylindrical portion 123a hanging down from the operation portion 191, the side wall 194a is guided inside the cylindrical portion 123a, when the nut member 19 is operated, whereby the inside of the skirt portion 195 makes contact with the outside of the cylindrical portion 123a to guide the motion at any time or when the joint connector 15 is distorted.

The nut member 19 is guided, when the concave portion 193 makes contact with the top end of the cylindrical portion 123a or the lower end portion of the side wall 194a makes contact with the step portion 121b of the mounting hole portion 121a, so that the working at the time of operation is oriented to allow the stable operation than in the embodiment 1. Further, the nut member 19 is prevented from loosening due to vibration in the mounted state on the electric reel 20.

In the third embodiment, the rotation operation of the nut member 19 is simplified, and facilitated. Further, when a force for bending the joint connector 15 is applied, the nut member 19 can regulate its bending force effectively. Since the nut member 19 is guided in contact with both the inside and outside of the cylindrical portion 123a, its rotation is stabilized, whereby a greater effect is expected.

Fourth Embodiment

In the fourth embodiment as shown in FIGS. 10 to 12, the joint connector 15 is made shorter than in the third embodiment, and as high as the opening 124a of the cylindrical portion 123a not to protrude upward of the opening 124a, in which its terminal structure is a convex connection terminal 151a, which is projected from the upper end portion of the nut member 19 and disposed above the opening 124a, whereby the same effect of the third embodiment can be expected. In this case, a concave connection terminal 24a is disposed in the feed connection portion 21 of the electric reel 20 to allow insertion of the convex connection terminals 151a of the joint connector 15 for the case main body 10. In this way, the joint connector 15 of the battery device for fishing may not be convex, and its terminal structure may be concave or convex, whereby the joint connector structure or terminal structure corresponding to the electric reel to be mounted may be employed.

In the explanation of the fourth embodiment, for the sake of convenience, the other parts may be constructed in the same way as in the third embodiment, whereby the same or like parts are designated by the same reference numerals and not described in detail.

Fifth Embodiment

In the fifth embodiment as shown in FIGS. 13 to 15, the cylindrical portion 123b of the case main body and the engaged portion 192b of the nut member 19 are extended to make the vertical length of the joint connector 15 shorter than in the fourth embodiment, and disposed to surround the convex connection terminals 151a, thereby forming a concave portion O surrounded by the inside of a central hole portion 10b of the nut member 19 and an upper portion of the joint connector 15. In this case, the ferrule portion 22 of the feed connection portion 21 for the electric reel 20, including the concave connection terminals 24a, extends long enough to correspond to the convex connection terminals 151a of the joint connector 15, forming a convex connector thrust into the concave portion O of the battery device for fishing. Thereby, the convex connection terminals 151a of the joint connector 15 are protected more effectively in a state where the case main body 10 is separated from the ferrule portion 22 of the electric reel 20, whereby the more favorable effect is expected than in the third embodiment 3.

In the sixth embodiment as shown in FIG. 16, the top end of the cylindrical portion 123c for the lid portion 12 is an abutment portion 123d, and the engaged portion 192c (lower end of the side wall 194) of the nut member 19 is slidingly placed in contact with the abutment portion 123d. The engaged portion 192c of the nut member 19 is rotatably engaged by the engagement portion 152 of the joint connector 15.

With the above constitution, if the operation portion 19 is rotated, the top end portion is rotationally slid with the abutment portion 123d of the cylindrical portion 123c in a state where the engaged portion 192c is engaged by the engagement portion 152 of the joint connector 15, so that the nut member 19 is screwed around the threaded portion 23 of the ferrule portion 22 for the feed connection portion 21 in the electric reel 20.

Thereby, the joint connector 15 is pressed in a state where the convexities of the feed connection portion 21 for the electric reel 20 are inserted into the concave connection terminals 151, and the case main body 10 is mounted and fixed around the ferrule portion 21 of the electric reel 20. With the sixth embodiment, the stable rotation operation of the nut member 19 is realized and the bending of the joint connector 15 in the case main body 10 or the looseness of the nut member 19 is also prevented.

Seventh Embodiment

In the seventh embodiment as shown in FIG. 17, a plurality of convex portion 193c are provided at regular intervals, opposed to the outer peripheral wall of the cylindrical portion 123a of the lid portion 12, on the inner wall of the concave portion 193b provided under the operation portion 191b of the nut member 19, as in the third embodiment. On the other hand, a ring-like guide wall 123e is provided peripherally corresponding to the convex portion 193c of the nut member 19 on the outer peripheral wall of the cylindrical portion 123a of the lid portion 12.

With the above constitution, if the operation portion 191b is rotated, the convex portion 193c inside the skirt portion 195b is fitted into the guide groove 123e of the cylindrical portion 123a in a state where the engaged portion 192a is engaged by the engagement portion 152 of the joint connector 15, so that the nut member 19 is guided and rotated in contact therewith, and screwed around the threaded portion 23 of the ferrule portion 22 of the feed connection portion 21 in the electric reel 20. Thereby, the joint connector 15 is pressed in a state where the convexities of the feed connection 21 for the electric reel 20 are inserted into the concave connection terminals 151, and the case main body 10 is mounted and fixed around the ferrule portion 21 of the electric reel 20. With this seventh embodiment, the nut member 19 is rotatably fitted around the cylindrical portion 123a of the case main body 10, and slid with the cylindrical portion 123a to perform the stable rotation operation, and prevent the bending of the joint connector 15 in the case main body 10. The nut member 19 is prevented from getting rid of the case main body 10, because the convex portion 193c is fitted into the guide groove 123e.

Though in the above embodiments the spool drive motor for the electric reel 20 is controlled employing the supplied electric power, the invention is not limited to the above embodiments, but electric power may be supplied to all the feed parts requiring the supply of power that are internally built in the electric reel 20.

Moreover, though in the above embodiments the battery device is employed as the power source for the electric reel 20, the invention is not limited to the above embodiments, but the battery device may be employed as the power source of the feed parts requiring the supply of power such as a line length measuring device.

This invention is not limited to the holding structure of the case main body 10 constituting the battery as described in the above embodiments, but the case main body 10 may be directly mounted and arranged on the electric reel 20, employing various kinds of holding means.

Eighth Embodiment

In the eight embodiment as shown in FIG. 18, the case main body 10 is formed from the lid portion 12 in which the storage portion 11 and the joint connector 15 are integrally protruded, and the cell main body 13 and the control portion 14 are tightly stored in the storage portion 11 with the lid portion 12. This joint connector 15 is provided with one pair of concave connection terminals 151, which are electrically connected to the control portion 14. And a ring-like engagement portion 152 is provided around the periphery of the joint connector 15, and a nut member 19 is rotationally provided corresponding to the engagement portion 152. The joint connector 15 is formed of synthetic resin that is a softer material than the storage portion 11 of the case main body 10 storing the cell main body 13, and has greater flexibility than the storage portion 11. This joint connector 15 is formed integrally with the lid portion 12 of the case main body 10, an upper portion of the case main body 10 is formed of the same material as the joint connector 15, and the storage portion 11a and the lid portion 12 are welded to prevent water from entering.

The joint connector 15 is flexed to relieve vibration, when the battery device for fishing is vibrated, and at the same time, the lid portion 12 on the upper portion of the case main body 10 is flexed to relieve vibration. The storage portion 11 of the case main body 10 storing the cell main body 13 is formed of a harder material than the lid portion 12 to prevent its breakage corresponding to the load from the outside when struck against other obstacles, whereby the cell main body 13 stored inside can be protected.

The joint connector 15 is inserted through the inside of the nut member 19 of holding means, the joint connector 15 inside the nut member 19 and the case main body 10 (cylindrical portion 123) outside the nut member 19 are disposed to surround the nut member 19. The nut member 19 is held in the battery device for fishing adjacently to or partially contact with the joint connector 15 and the case main body 10. Since the rotational operation of the nut member 19 is made while sliding with the joint connector 15 and the case main body 10 (cylindrical portion 123), the battery device can be mounted stably in the feed connection portion 21 of the electric reel 20 by deriving the rotational direction.

If the battery device is mounted in the feed connection portion 21 of the electric reel 20, the nut member 19 of the holding means has its inside contact with the outside of the joint connector 15, with its outside contact with the case main body 10 (cylindrical portion 123) or contacted by the case main body 10 (cylindrical portion 123) when at least the joint connector 15 is flexed due to its flexibility. Accordingly, even if the battery device for fishing is vibrated by a fishing operation, its vibration is relieved, and the looseness of the nut member 19 against the feed connection portion 21 of the electric reel 20 is prevented.

Ninth Embodiment

Moreover, in the ninth embodiment as shown in FIG. 19, the case main body 10 is composed of the storage portion 11 and the lid portion 12, and stores the cell main body 13 and the control portion 14. And an attachment 9 is put on the lid portion 12. In this way, even if the joint connector 15 is mounted via the attachment 9 to the case main body 10, the attachment is regarded as a part of the case main body 10b. In this attachment 9, the joint connector 15 provided with one pair of concave connection terminals 151 is sealed and mounted via the packing member 17b, and tightly stores the cell main body 13 and the control portion 14 in cooperation with the case main body 10. The one pair of concave connection terminals 151 are electrically connected to the control portion 14.

The joint connector 15 is provided with a ring-like engagement portion 152, and the nut member 19 making up the holding means is rotationally provided corresponding to the engagement portion 152. The joint connector 15 is inserted through the inside of the nut member 19 of the holding means, with the joint connector 15 disposed inside the nut member 19, and the cylindrical portion 123 of the attachment 9 outside. The nut member 19 is held in the battery device for fishing adjacently to or partially contact with the joint connector 15 and the attachment 9. Since the rotational operation of the nut member 19 is made while sliding with the joint connector 15 and the cylindrical portion 123 of the attachment 9, the battery device can be mounted stably in the feed connection portion 21 of the electric reel 20 by deriving the rotational direction.

If the battery device is mounted in the feed connection portion 21 of the electric reel 20, the nut member 19 of the holding means has its inside contact with the outside of the joint connector 15, with its outside disposed or contacted to be surrounded by the cylindrical portion 123 of the attachment 9 or contacted by the cylindrical portion 123 of the attachment 9 when at least the joint connector 15 is flexed due to its flexibility. Accordingly, even if the battery device for fishing is vibrated by a fishing operation, its vibration is relieved, and the looseness of the nut member 19 against the feed connection portion 21 of the electric reel 20 is prevented.

The joint connector 15 is formed of synthetic resin that has greater flexibility and is softer than the case main body 10. An elastic arm portion 18 provided with the protection cap 181 is attached to the attachment 9.

Hence, this invention is not limited to the above embodiments, but various modifications may be made thereto without departing from the spirit or scope of the invention at practical stage. Further, the above embodiments include the invention at various stages, and various other inventions may be conceived in appropriate combinations of components as disclosed.

For example, even though some of the components are deleted from all the components as shown in the embodiments, if the problems as described in the paragraph of the problems solved by the invention can be solved and the effects as described in the effect of the invention are achieved, the constitution in which the components are deleted may be extracted as the invention.

What is claimed is:

1. A battery device for fishing comprising:
a case main body which stores a cell;
a projected-columnar joint connector which is received in a recessed-cylindrical feed connection portion of an external power source connection of a fishing reel to electrically connect the cell to the feed connection portion, wherein the joint connector is attached to the case main body; and
a holding member which mounts the case main body to the feed connection portion of the fishing reel,
wherein the battery device is attached to the fishing reel only through the feed connection portion.

2. The battery device for fishing according to claim 1, wherein the holding member is provided at the case main body and the joint connector.

3. The battery device for fishing according to claim 1, wherein the holding member surrounds the joint connector.

4. The battery device for fishing according to claim 1, wherein the holding member slides with respect to the case main body by a mounting operation on the fishing reel.

5. The battery device for fishing according to claim 4, wherein the holding member slides in a direction of mounting the case main body to the fishing reel.

6. The battery device for fishing according to claim 1, wherein the holding member comprises a nut member which rotates around the joint connector and securely mounts the case main body to the fishing reel.

7. The battery device for fishing according to claim 1, wherein the case main body comprises an inclined portion from a storage portion in which the cell is stored to a cylindrical portion where the joint connector is provided.

8. The battery device for fishing according to claim 1, wherein the case main body surrounds at least a portion of the holding member.

9. The battery device for fishing according to claim 1, wherein the holding member is within a circumference of the case main body.

10. The battery device for fishing according to claim 1, wherein the holding member is rotatably fitted to the case main body.

11. The battery device for fishing according to claim 1, wherein the holding member mounts the case main body to the fishing reel and the joint connector is attached to the feed connection portion.

12. The battery device for fishing according to claim 11, wherein the holding member covers at least a portion of the joint connector and the feed connection portion if electrically connected.

13. The battery device for fishing according to claim 11, wherein a base end portion of the joint connector is fixed inside the case main body.

14. The battery device for fishing according to claim 11, wherein a base end portion of the joint connector is supported by a cylindrical portion of the case main body.

15. The battery device for fishing according to claim 11, wherein the joint connector comprises a flexible material softer than the case main body.

16. The battery device for fishing according to claim 11, wherein the case main body comprises a protection cap detachably attached to an end portion of the joint connector.

17. The battery device for fishing according to claim 1, wherein the joint connecter projects from the case main body.

18. The battery device for fishing according to claim 1, wherein the joint connector is inserted through an inside of the holding member.

19. The battery device for fishing according to claim 1, wherein a portion of the holding member is disposed in a gap between the case main body and the joint connector.

20. A fishing system comprising:
a fishing reel comprising:
a reel body,
a spool for winding the fishing reel rotatably supported by the reel body,
a motor for driving and rotating the spool, and
a recessed-cylindrical feed connection portion through which power is supplied to the motor;
and
a battery device comprising:
a projected-columnar joint connector which is received in the feed connection portion to electrically connect the battery device to the feed connection portion of the fishing reel,
a holding member which mounts the joint connector to the feed connection portion of the fishing reel,
a cell,
a case main body which stores the cell,
wherein the joint connector is projected from an upper portion of the case main body and is softer than the case main body, and
wherein the case main body is attached to the fishing reel only through the feed connection portion.

21. The fishing system according to claim 20, wherein the feed connection portion is selectively connected to a cable connector of a feeding cord which extends from an external power source and the joint connector to supply power from the external power source or the battery device.

22. The fishing system according to claim 20, wherein the feed connection portion is provided at a portion lower than a spool shaft which supports the spool and provided at a side opposite to a side in which a handle is provided, and the battery device is arranged at a lower side of the feed connection portion.

23. The fishing system according to claim 20, wherein the cell of the battery device comprises a lithium ion cell.

24. The fishing system according to claim 20, wherein the battery device is attached to a side of the fishing reel opposite to a side at which a center of gravity of the fishing reel exists with respect to a reel leg.

* * * * *